(12) United States Patent
Rasmussen et al.

(10) Patent No.: US 8,906,138 B2
(45) Date of Patent: Dec. 9, 2014

(54) METHODS OF GENERATING AND UTILIZING UTILITY GAS

(75) Inventors: Peter C. Rasmussen, Conroe, TX (US);
Paul L. Tanaka, Sugar Land, TX (US);
Bruce T. Kelley, Kingwood, TX (US);
Stanley O. Uptigrove, The Woodlands, TX (US); Harry W. Deckman, Clinton, NJ (US)

(73) Assignee: ExxonMobil Upstream Research Company, Houston, TX (US)

( * ) Notice: Subject to any disclaimer, the term of this patent is extended or adjusted under 35 U.S.C. 154(b) by 329 days.

(21) Appl. No.: 12/680,864

(22) PCT Filed: Oct. 14, 2008

(86) PCT No.: PCT/US2008/079870
§ 371 (c)(1),
(2), (4) Date: Mar. 30, 2010

(87) PCT Pub. No.: WO2009/064569
PCT Pub. Date: May 22, 2009

(65) Prior Publication Data
US 2010/0212493 A1 Aug. 26, 2010

Related U.S. Application Data

(60) Provisional application No. 60/987,308, filed on Nov. 12, 2007.

(51) Int. Cl.
*B01D 53/047* (2006.01)
*B01D 53/04* (2006.01)
*F04D 29/10* (2006.01)
*F04D 29/12* (2006.01)

(52) U.S. Cl.
CPC .......... *B01D 53/04* (2013.01); *B01D 2257/504* (2013.01); *Y02C 10/08* (2013.01); *B01D 2257/302* (2013.01); *F04D 29/104* (2013.01); *F04D 29/124* (2013.01); *B01D 2257/304* (2013.01); *B01D 2257/80* (2013.01); *B01D 2256/10* (2013.01)
USPC ...................... 95/96; 95/105; 95/148; 96/130

(58) Field of Classification Search
USPC .................................. 95/96, 148, 105; 96/130
See application file for complete search history.

(56) References Cited

U.S. PATENT DOCUMENTS

| 1,868,138 A | 7/1932 | Fisk |
| 3,124,152 A | 3/1964 | Payne |

(Continued)

FOREIGN PATENT DOCUMENTS

| CA | 2 234 924 | 4/1998 |
| CA | 2 224 471 | 6/1998 |

(Continued)

OTHER PUBLICATIONS

Face to Face: The Sealing Technology Magazine, Flowserve, vol. 17, No. 1, 2005.

(Continued)

*Primary Examiner* — Robert A Hopkins
(74) *Attorney, Agent, or Firm* — ExxonMobil Upstream Research Company Law Department

(57) ABSTRACT

The present application is directed to a method and system for preparing gaseous utility streams from gaseous process streams, nitrogen process streams, and other types of streams. The methods and systems may include at least one swing adsorption process including pressure swing adsorption, temperature swing adsorption, and rapid-cycle adsorption processes to treat gaseous streams for use in dry gas seals of rotating equipment such as compressors, turbines and pumps and for other utilities. The systems and processes of the present disclosure are further applicable to high pressure gaseous streams, for example, up to about 600 bar.

20 Claims, 11 Drawing Sheets

(56) References Cited

U.S. PATENT DOCUMENTS

| | | |
|---|---|---|
| 3,142,547 A | 7/1964 | Marsh et al. |
| 3,508,758 A | 4/1970 | Strub |
| 3,602,247 A | 8/1971 | Bunn et al. |
| 3,788,036 A | 1/1974 | Lee et al. |
| 3,967,464 A | 7/1976 | Cormier et al. |
| 4,261,815 A | 4/1981 | Kelland |
| 4,324,565 A | 4/1982 | Benkmann |
| 4,329,162 A | 5/1982 | Pitcher, Jr. |
| 4,340,398 A | 7/1982 | Doshi et al. |
| 4,711,968 A | 12/1987 | Oswald et al. |
| 4,770,676 A | 9/1988 | Sircar et al. ............. 55/26 |
| 4,784,672 A | 11/1988 | Sircar |
| 4,790,272 A | 12/1988 | Woolenweber |
| 4,816,039 A | 3/1989 | Krishnamurthy et al. |
| 4,877,429 A | 10/1989 | Hunter |
| 4,977,745 A | 12/1990 | Heichberger ............. 62/10 |
| 5,110,328 A | 5/1992 | Yokota et al. |
| 5,125,934 A * | 6/1992 | Krishnamurthy et al. ...... 95/101 |
| 5,169,006 A | 12/1992 | Stelzer |
| 5,174,796 A | 12/1992 | Davis et al. |
| 5,224,350 A | 7/1993 | Mehra |
| 5,234,472 A | 8/1993 | Krishnamurthy et al. |
| 5,292,990 A | 3/1994 | Kantner et al. |
| 5,306,331 A | 4/1994 | Auvil et al. |
| 5,370,728 A | 12/1994 | LaSala et al. |
| 5,565,018 A | 10/1996 | Baksh et al. |
| 5,700,310 A | 12/1997 | Bowman et al. |
| 5,750,026 A | 5/1998 | Gadkaree et al. |
| 5,792,239 A | 8/1998 | Reinhold, III et al. |
| 5,807,423 A | 9/1998 | Lemcoff et al. |
| 5,811,616 A | 9/1998 | Holub et al. |
| 5,827,358 A | 10/1998 | Kulish et al. |
| 5,906,673 A | 5/1999 | Reinhold, III et al. |
| 5,924,307 A | 7/1999 | Nenov |
| 5,935,444 A | 8/1999 | Johnson et al. ............. 210/691 |
| 5,968,234 A | 10/1999 | Midgett, II et al. |
| 5,976,221 A | 11/1999 | Bowman et al. |
| 5,997,617 A | 12/1999 | Czabala et al. |
| 6,007,606 A | 12/1999 | Baksh et al. |
| 6,011,192 A | 1/2000 | Baker et al. |
| 6,053,966 A | 4/2000 | Moreau et al. |
| 6,063,161 A | 5/2000 | Keefer et al. |
| 6,099,621 A | 8/2000 | Ho |
| 6,129,780 A | 10/2000 | Millet et al. |
| 6,136,222 A | 10/2000 | Friesen et al. |
| 6,147,126 A | 11/2000 | DeGeorge et al. |
| 6,171,371 B1 | 1/2001 | Derive et al. |
| 6,176,897 B1 | 1/2001 | Keefer |
| 6,179,900 B1 | 1/2001 | Behling et al. |
| 6,210,466 B1 | 4/2001 | Whysall et al. |
| 6,231,302 B1 | 5/2001 | Bonardi |
| 6,245,127 B1 | 6/2001 | Kane et al. |
| 6,284,021 B1 | 9/2001 | Lu et al. |
| 6,311,719 B1 | 11/2001 | Hill et al. |
| 6,345,954 B1 | 2/2002 | Al-Himyary et al. |
| 6,398,853 B1 | 6/2002 | Keefer et al. |
| 6,406,523 B1 | 6/2002 | Connor et al. |
| 6,436,171 B1 | 8/2002 | Wang et al. |
| 6,444,012 B1 | 9/2002 | Dolan et al. |
| 6,444,014 B1 | 9/2002 | Mullhaupt et al. |
| 6,444,523 B1 | 9/2002 | Fan et al. |
| 6,451,095 B1 | 9/2002 | Keefer et al. |
| 6,457,485 B2 | 10/2002 | Hill et al. |
| 6,471,939 B1 | 10/2002 | Boix et al. |
| 6,488,747 B1 | 12/2002 | Keefer et al. |
| 6,497,750 B2 | 12/2002 | Butwell et al. |
| 6,500,241 B2 | 12/2002 | Reddy |
| 6,500,404 B1 | 12/2002 | Camblor Fernandez et al. |
| 6,506,351 B1 | 1/2003 | Jain et al. |
| 6,517,609 B1 | 2/2003 | Monereau et al. |
| 6,531,516 B2 | 3/2003 | Davis et al. |
| 6,533,846 B1 | 3/2003 | Keefer et al. |
| 6,565,627 B1 | 5/2003 | Golden et al. |
| 6,565,635 B2 | 5/2003 | Keefer et al. |
| 6,565,825 B2 | 5/2003 | Ohji et al. ............. 423/625 |
| 6,572,678 B1 | 6/2003 | Wijmans et al. |
| 6,579,341 B2 | 6/2003 | Baker et al. |
| 6,593,541 B1 | 7/2003 | Herren |
| 6,595,233 B2 | 7/2003 | Pulli |
| 6,605,136 B1 | 8/2003 | Graham et al. |
| 6,607,584 B2 | 8/2003 | Moreau et al. |
| 6,630,012 B2 | 10/2003 | Wegeng et al. |
| 6,641,645 B1 | 11/2003 | Lee et al. |
| 6,660,065 B2 | 12/2003 | Byrd et al. |
| 6,712,087 B2 | 3/2004 | Hill et al. |
| 6,746,515 B2 | 6/2004 | Wegeng et al. |
| 6,752,852 B1 | 6/2004 | Jacksier et al. |
| 6,802,889 B2 | 10/2004 | Graham et al. |
| 6,835,354 B2 | 12/2004 | Woods et al. |
| 6,916,358 B2 | 7/2005 | Nakamura et al. |
| 6,918,953 B2 | 7/2005 | Lomax, Jr. et al. |
| 6,974,496 B2 | 12/2005 | Wegeng et al. |
| 7,025,801 B2 | 4/2006 | Monereau |
| 7,094,275 B2 | 8/2006 | Keefer et al. |
| 7,117,669 B2 | 10/2006 | Kaboord et al. |
| 7,144,016 B2 | 12/2006 | Gozdawa |
| 7,160,356 B2 | 1/2007 | Koros |
| 7,160,367 B2 | 1/2007 | Babicki et al. |
| 7,166,149 B2 | 1/2007 | Dunne et al. |
| 7,189,280 B2 | 3/2007 | Alizadeh-Khiavi et al. |
| 7,250,074 B2 | 7/2007 | Tonkovich et al. |
| 7,276,107 B2 | 10/2007 | Baksh et al. |
| 7,297,279 B2 | 11/2007 | Johnson et al. ............. 210/669 |
| 7,311,763 B2 | 12/2007 | Neary |
| RE40,006 E | 1/2008 | Keefer et al. |
| 7,314,503 B2 | 1/2008 | Landrum et al. |
| 7,390,350 B2 | 6/2008 | Weist, Jr. et al. |
| 7,404,846 B2 | 7/2008 | Golden et al. |
| 7,449,049 B2 | 11/2008 | Thomas et al. |
| 7,527,670 B2 | 5/2009 | Ackley et al. |
| 7,578,864 B2 | 8/2009 | Watanabe et al. |
| 7,604,682 B2 | 10/2009 | Seaton |
| 7,637,989 B2 | 12/2009 | Bong |
| 7,641,716 B2 | 1/2010 | Lomax, Jr. et al. |
| 7,645,324 B2 | 1/2010 | Rode et al. |
| 7,651,549 B2 | 1/2010 | Whitley |
| 7,674,319 B2 | 3/2010 | Lomax, Jr. et al. |
| 7,687,044 B2 | 3/2010 | Keefer et al. |
| 7,713,333 B2 | 5/2010 | Rege et al. |
| 7,722,700 B2 | 5/2010 | Sprinkle |
| 7,731,782 B2 | 6/2010 | Kelley et al. |
| 7,740,687 B2 | 6/2010 | Reinhold, III |
| 7,744,676 B2 | 6/2010 | Leitmayr et al. |
| 7,763,098 B2 | 7/2010 | Alizadeh-Khiavi et al. |
| 7,819,948 B2 | 10/2010 | Wagner |
| 7,858,169 B2 | 12/2010 | Yamashita |
| 7,938,886 B2 | 5/2011 | Hershkowitz et al. |
| 7,947,120 B2 | 5/2011 | Deckman et al. |
| 7,959,720 B2 | 6/2011 | Deckman et al. |
| 8,034,164 B2 | 10/2011 | Lomax, Jr. et al. |
| 8,071,063 B2 | 12/2011 | Reyes et al. |
| 8,142,745 B2 | 3/2012 | Reyes et al. |
| 8,142,746 B2 | 3/2012 | Reyes et al. |
| 8,192,709 B2 | 6/2012 | Reyes et al. |
| 8,262,783 B2 | 9/2012 | Stoner et al. |
| 8,268,043 B2 | 9/2012 | Celik et al. |
| 8,272,401 B2 | 9/2012 | McLean |
| 8,319,090 B2 | 11/2012 | Kitamura |
| 8,361,200 B2 | 1/2013 | Sayari et al. |
| 8,444,750 B2 | 5/2013 | Deckman et al. |
| 8,512,569 B2 | 8/2013 | Eaton et al. ............. 210/650 |
| 8,529,662 B2 | 9/2013 | Kelley et al. |
| 8,529,663 B2 | 9/2013 | Reyes et al. |
| 8,529,664 B2 | 9/2013 | Deckman et al. |
| 8,529,665 B2 | 9/2013 | Manning et al. |
| 8,545,602 B2 | 10/2013 | Chance et al. |
| 8,591,627 B2 | 11/2013 | Jain |
| 2001/0047824 A1 | 12/2001 | Hill et al. |
| 2002/0124885 A1 | 9/2002 | Hill et al. |
| 2002/0162452 A1 | 11/2002 | Butwell et al. |
| 2003/0075485 A1 | 4/2003 | Ghijsen |
| 2003/0131728 A1 | 7/2003 | Kanazirev et al. ............. 95/96 |
| 2003/0170527 A1 | 9/2003 | Finn et al. |
| 2003/0205130 A1 | 11/2003 | Neu et al. |

(56) References Cited

U.S. PATENT DOCUMENTS

| | | |
|---|---|---|
| 2003/0223856 A1 | 12/2003 | Yuri et al. |
| 2004/0099142 A1 | 5/2004 | Arquin et al. |
| 2004/0197596 A1 | 10/2004 | Connor et al. |
| 2004/0232622 A1 | 11/2004 | Gozdawa |
| 2005/0109419 A1 | 5/2005 | Ohmi et al. |
| 2005/0114032 A1 | 5/2005 | Wang |
| 2005/0129952 A1 | 6/2005 | Sawada et al. |
| 2005/0145111 A1 | 7/2005 | Keefer et al. |
| 2005/0150378 A1 | 7/2005 | Dunne et al. |
| 2005/0229782 A1 | 10/2005 | Monereau et al. |
| 2005/0252378 A1 | 11/2005 | Celik et al. |
| 2006/0048648 A1 | 3/2006 | Gibbs et al. |
| 2006/0049102 A1 | 3/2006 | Miller et al. |
| 2006/0105158 A1 | 5/2006 | Fritz et al. |
| 2006/0162556 A1 | 7/2006 | Ackley et al. |
| 2006/0165574 A1 | 7/2006 | Sayari |
| 2006/0169142 A1 | 8/2006 | Rode et al. |
| 2006/0236862 A1 | 10/2006 | Golden et al. |
| 2007/0084241 A1 | 4/2007 | Kretchmer et al. ............ 63/29.2 |
| 2007/0084344 A1 | 4/2007 | Moriya et al. |
| 2007/0222160 A1 | 9/2007 | Roberts-Haritonov et al. |
| 2007/0253872 A1 | 11/2007 | Keefer et al. |
| 2007/0283807 A1 | 12/2007 | Whitley |
| 2008/0051279 A1 | 2/2008 | Klett et al. |
| 2008/0072822 A1 | 3/2008 | White |
| 2008/0282883 A1 | 11/2008 | Rarig et al. |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance et al. |
| 2008/0282892 A1 | 11/2008 | Deckman et al. |
| 2008/0289497 A1 | 11/2008 | Barclay et al. |
| 2008/0307966 A1 | 12/2008 | Stinson ............................ 95/187 |
| 2008/0314246 A1 | 12/2008 | Deckman et al. |
| 2009/0004073 A1 | 1/2009 | Gleize et al. |
| 2009/0037550 A1 | 2/2009 | Mishra et al. |
| 2009/0079870 A1 | 3/2009 | Matsui |
| 2009/0107332 A1 | 4/2009 | Wagner |
| 2009/0151559 A1 | 6/2009 | Verma et al. |
| 2009/0241771 A1 | 10/2009 | Manning et al. |
| 2009/0308248 A1 | 12/2009 | Siskin et al. |
| 2010/0059701 A1 | 3/2010 | McLean |
| 2010/0077920 A1 | 4/2010 | Baksh et al. |
| 2010/0089241 A1 | 4/2010 | Stoner et al. |
| 2010/0212493 A1 | 8/2010 | Rasmussen et al. |
| 2010/0251887 A1 | 10/2010 | Jain |
| 2010/0252497 A1 | 10/2010 | Ellison et al. |
| 2010/0263534 A1 | 10/2010 | Chuang |
| 2010/0282593 A1 | 11/2010 | Speirs et al. |
| 2011/0031103 A1 | 2/2011 | Deckman et al. |
| 2011/0146494 A1 | 6/2011 | Desai et al. |
| 2011/0217218 A1 | 9/2011 | Gupta et al. |
| 2011/0277620 A1 | 11/2011 | Keefer et al. |
| 2011/0308524 A1 | 12/2011 | Brey et al. ................. 128/205.12 |
| 2012/0024152 A1 | 2/2012 | Yamawaki et al. |
| 2012/0031144 A1 | 2/2012 | Northrop et al. |
| 2012/0067216 A1 | 3/2012 | Corma Canos et al. |
| 2012/0152115 A1 | 6/2012 | Gerds et al. |
| 2012/0222551 A1 | 9/2012 | Deckman |
| 2012/0222552 A1 | 9/2012 | Ravikovitch et al. |
| 2012/0222553 A1 | 9/2012 | Kamakoti et al. |
| 2012/0222554 A1 | 9/2012 | Leta et al. |
| 2012/0222555 A1 | 9/2012 | Gupta et al. |
| 2012/0255377 A1 | 10/2012 | Kamakoti et al. |
| 2012/0308456 A1 | 12/2012 | Leta et al. |
| 2012/0312163 A1 | 12/2012 | Leta et al. |
| 2013/0061755 A1 | 3/2013 | Frederick et al. |
| 2013/0225898 A1 | 8/2013 | Sundaram et al. |

FOREIGN PATENT DOCUMENTS

| | | | |
|---|---|---|---|
| CA | 2 228 206 | 7/1998 | |
| CA | 2 297 591 | 2/2000 | |
| CA | 2 297 590 | 8/2000 | |
| CA | 2 237 103 | 12/2001 | |
| CA | 2 357 356 | 3/2002 | |
| EP | 0257493 | 8/1987 | |
| EP | 0257493 | 3/1988 | |
| EP | 0426937 | 5/1990 | |
| EP | 1045728 | 12/1998 | |
| EP | 1 004 341 | 5/2000 | |
| EP | 1004341 | 5/2000 | |
| EP | 1 018 359 | 7/2000 | |
| EP | 1 413 348 | 4/2004 | |
| EP | 1 577 561 | 9/2005 | |
| EP | 1 203 610 | 12/2005 | |
| EP | 1 798 197 | 6/2007 | |
| JP | 58-114715 | 7/1983 | ............ B01D 53/50 |
| JP | 59-232174 | 12/1984 | |
| JP | 2000-024445 | 1/2000 | |
| JP | 2002 348651 | 12/2002 | |
| JP | 2002/348651 | 12/2002 | |
| JP | 2006-16470 | 1/2006 | |
| JP | 2006-036849 | 2/2006 | |
| JP | 2008272534 | 11/2008 | ............ B01D 53/04 |
| WO | WO 99/43418 | 9/1999 | |
| WO | WO00/35560 | 6/2000 | |
| WO | WO 2005/032694 | 8/2005 | |
| WO | WO 2005/070518 | 8/2005 | |
| WO | WO 2006/017940 | 2/2006 | |
| WO | WO 2006/074343 | 7/2006 | |
| WO | WO 2007/111738 | 10/2007 | |
| WO | WO2008/143820 | 11/2008 | |
| WO | WO2008/143821 | 11/2008 | |
| WO | WO2008/143823 | 11/2008 | |
| WO | WO2008/143825 | 11/2008 | |
| WO | WO2008/143826 | 11/2008 | |
| WO | WO 2010/123598 | 10/2010 | |
| WO | WO 2010/130787 | 11/2010 | |
| WO | WO 2011/139894 | 11/2011 | |
| WO | WO2012/118755 | 9/2012 | |
| WO | WO2012/118757 | 9/2012 | |
| WO | WO2012/118758 | 9/2012 | |
| WO | WO2012/118759 | 9/2012 | |
| WO | WO2012/118760 | 9/2012 | |
| WO | WO2012/161826 | 11/2012 | |
| WO | WO2012/161828 | 11/2012 | |
| WO | WO2013/022529 | 2/2013 | |

OTHER PUBLICATIONS

Stahley, John S., Design, Operation, and Maintenance Considerations for Improved Dry Gas Seal Reliability in Centrifugal Compressors, 2003.

GE Oil & Gas: Dry Gas Seal Retrofit, Jan. 2007.

U.S. Appl. No. 12/921,532, filed Mar. 18, 2009, Deckman et al.

U.S. Appl. No. 12/680,864, filed Mar. 30, 2010, Rasmussen et al.

U.S. Appl. No. 13/602,750, filed Sep. 4, 2012, Sundaram et al.

Conviser, S. A. (1964), "Removal of Co2 from Natural Gas With Molecular Sieves," *Publication*, pp. 1F-12F.

ExxonMobil Research and Engineering and Xebec, (2008), A New Commercialized Process for Lower Cost H2 Recovery—Rapid Cycle Pressure Swing Adsorption (RCPSA), *Brochure*.

EP Application No. 08158850.1-2113; EP Search Report dated Dec. 16, 2008.

ExxonMobil Research and Engineering and Quest Air (2008), RCPSA-Rapid Cycle Pressure Swing Adsorption—an Advanced Low-Cost Commercialized H2 Recovery Process, *Brochure*, 2 pages.

Farooq, S., et al., (1990), "Continuous Countercurrent Flow Model for a Bulk PSA Separation Process," *AIChEJ*, v.36(2), pp. 310-314.

Herrmann, F.J., et al., (2008), "Curvelet-Based Seismic Data Processing: A Multiscale and Nonlinear Approach," *Geophysics*, v. 73, pp. A1-A5.

Hopper, B. L., et al. (2008), "World's First 10,000 PSI Sour Gas Injection Compressor," *Proceedings of the Thirty-Seventh Turbomachinery Symposium*, pp. 73-95, http://turbolab.tamu.edu/uploads/files/paperst37/T37-LEC08.pdf.

PCT ApplicationPCT/US2009/037550—International Search Report dated Jun. 29, 2009.-

(56) References Cited

OTHER PUBLICATIONS

Reyes, S.C., et al. (1997), "Frequency Modulation Methods for Diffusion and Adsorption Measurements in Porous Solids," *J. Phys. Chem. B*., v.101, pp. 614-622.

Sahni, I. et al., (2005), "Multisolution Wavelet Analysis for Improved Reservoir Description," SPE87820, *Soc. of Petroleum Eng.-Reservoir Evaluation & Engineering*, pp. 53-69 (xp-002550569).

Suzuki, M. (1985), "Continuous-Countercurrent-Flow Approximationi for Dynamic Steady State Profile of Pressure Swing Adsorption," *AIChE Symp. Ser*. V81 (242), pp. 67-73.

Kikkinides, E. S. et al. (1995) "Natural Gas Desulfurization by Adsorption: Feasibility and Multiplicity of Cyclic Steady States," *Ind. Eng. Chem. Res*. V. 34, pp. 255-262.

\* cited by examiner

METHODS OF GENERATING AND UTILIZING UTILITY GAS

CROSS REFERENCE TO RELATED APPLICATIONS

This application is the National Stage Application of International Application No. PCT/US2008/079870, filed 14 Oct. 2008, which claims the benefit of U.S. Provisional Application No. 60/987,308, filed 12 Nov. 2007.

FIELD OF THE INVENTION

This invention relates generally to methods of processing slip streams. More specifically, the invention relates to processes for treating gas dominated process slip streams for use as a utility gas.

BACKGROUND

This section is intended to introduce the reader to various aspects of art, which may be associated with exemplary embodiments of the present invention, which are described and/or claimed below. This discussion is believed to be helpful in providing the reader with information to facilitate a better understanding of particular techniques of the present invention. Accordingly, it should be understood that these statements are to be read in this light, and not necessarily as admissions of prior art.

Most gas compressor applications or gas processing facilities today utilize some compressed or processed gas to supply seals, fuel systems and other auxiliary equipment within the process as a utility gas fluid. Most of these auxiliary systems or other uses of the gas being compressed often require the gas to be clean and dry including no liquid condensation during pressure regulation or pressure drop through the seals or auxiliary systems (dew point control). They also often require detoxification and corrosion protection by removing specific hazardous or corrosive gases and liquids like hydrogen sulfide ($H_2S$) or carbon dioxide ($CO_2$) and water.

Traditional methods to strip out these unwanted components require capital intensive and large complex equipment such as molecular sieves, distillation towers, glycol contactor and other traditional separation equipment. The volume of gas required for these utilities is often small relative to the overall gas being handled in the process and if these processes are not required for the entire gas stream the costs associated with this separation, dehydration, detoxification, corrosion control or component selection can be prohibitive to a project, especially in remote locations or locations where infrastructure does not yet exist. Alternative systems to pipe in fuel gas, produce inert gas, supply clean dry seal gas at sufficient pressure can also be very complex and costly.

Compressor shafts are typically sealed using dry gas seals (DGS) which utilize the principle of sealing between a stationary face against a rotating face by using a gas fluid film. This "seal gas" provides the lubrication and cooling properties needed by the seal for long and reliable operation. Seal gas must be free of particulates, free of liquids, and not have physical properties that cause condensation of the seal gas when expanded across the seal faces. A common cause of compressor failure or trip is a result of seals failing and the most predominant cause for seal failure is caused by contaminants in the process gas, both liquid and solid contaminants.

The source of seal gas for many compressor applications is the process gas being compressed. The pressure needed for seal gas is greater than the compressor suction pressure, but less than the compressor discharge pressure. Therefore many applications utilize discharge gas as the seal gas source when suitable. However, in some applications discharge stream components will condense across the seal faces even after filtering and heating.

In some situations such as high pressure sour gas service, the seal gas has been obtained from another utility source such as a fuel gas system. Such gas from the other utility gas source is then compressed and used as seal gas. Such gas is used in order to avoid the liquid contamination or liquid drop out encountered by using the process gas. This requires additional process and separation units to generate the fuel gas and a separate seal gas booster compressor (e.g. a reciprocating compressor), which can itself be a source of oil and particulate contamination. Usually a reciprocating compressor is used for this service due to the high compression ratios and low flows. Reciprocating compressors of this type are usually lubricated with cylinder oil that has some miscibility with the gas, especially at high pressures. Thus it can not be filtered out at high pressure but condenses or "drops out" of the gas when the pressure is dropped through the seals or at pressure regulators that control the pressure to the seals. This cylinder oil "carry-over" into the seal gas may damage and cause premature failure of standard DGS's.

It is also common with high pressure hydrogen compressors in refineries that process gases can have liquids condense out of the gas with the pressure drop across the dry seal faces. An alternative gas sometimes used is hydrogen from a hydrogen make up line from a reciprocating compressor which may also contaminate the gas with lubrication oil.

Another example of a use of the gas being processed or compressed is fuel gas for gas turbines and steam boilers. Modern gas combustors, and low emissions combustors in particular require a substantially constant composition in order to maintain an acceptable operating condition. Additionally, if liquids are entrained or condense (drop) out in these fuel gas systems during pressure drops (e.g. across a fuel control valve) or cooling in piping, problems can result within the turbine or boiler combustion chambers including unstable operation, inefficient operation, reduced reliability, and/or increased emissions of environmentally regulated species, including, for example, nitrogen oxides (NOx), carbon monoxide (CO) and/or sulfur (e.g. sulfur oxides (SOx)) emissions. In addition toxic or corrosive components in these gases can be a safety issue as well as detrimental to the equipment and the environment. Detoxification and corrosion control are described in more detail below.

The removal of $H_2S$, $CO_2$, water and other toxic or corrosive components (such as sulfur containing materials) from a gas stream in order to make it less corrosive or toxic are common challenges in trying to utilize well stream gas or saturated gas as a utility fluid. Removal of these types of components can make seal gas systems and fuel gas systems safer, more reliable and more environmentally friendly or make the utility systems simpler and less costly. Gas processing and drying equipment to condition the gas to remove these toxic or corrosive components can be very costly and complex and are often not feasible for the volumes required for fuel gas or for gas seals in a given process or operation.

Nitrogen or inert gas systems are often used as a utility in gas processing and compression equipment. For example a blanket or inert gas purge is used in seals to ensure toxic or hydrocarbon gasses do not leak to the environment, to prevent an explosive mixture, to sweep out left over hydrocarbons before maintenance, or as a separation barrier between different fluids such as process gas and the lubrication oil in gas seals. Nitrogen systems designed to separate the nitrogen from air are commonly used to provide this inert utility fluid. In some cases the nitrogen is separated out of the process gas if the gas has a high percentage of nitrogen, making it less valuable as a fuel and thus justifying the added high processing cost. However, for small volumes or where the percentage of nitrogen in the gas is small, these types of systems are not justifiable.

New methods of treating process gas for use as a utility gas are needed.

SUMMARY

In one embodiment, a method of treating a gaseous feed stream is provided. The method includes the steps of producing a gaseous feed stream; dividing at least a portion of the gaseous feed stream to form a gaseous slip stream; separating the gaseous slip stream using a selective component removal system having at least one swing adsorption process unit to form a utility stream for use in a utility component; feeding the utility stream into the utility component, wherein the utility stream is compatible with the utility component; and utilizing the utility stream in the utility component. The gaseous feed stream may be a high pressure process stream, a hydrocarbon containing stream, or a compressor discharge stream. The utility component may be a compressor, a dry-seal compressor, a compressor string, a turbo-expander compressor, a turbo-expander generator, a pump, a fired steam boiler, a fired process heater, a gas engine, a hermetically sealed direct-drive electric motor, turbomachinery equipped with magnetic bearings, gas-operated instruments and controls, or a gas turbine. The swing adsorption process unit may be a pressure swing unit, a thermal swing unit, a partial pressure swing or displacement purge adsorption unit, a rapid cycle or compact unit.

In another embodiment, a method of treating a nitrogen-rich gaseous stream is provided. The method includes producing a nitrogen-rich gaseous stream; separating at least a portion of the nitrogen-rich gaseous stream using a selective component removal system having at least one swing adsorption process unit to form a utility stream for use in a utility component; feeding the utility stream into the utility component, wherein the utility stream is compatible with the utility component; and utilizing the utility stream in the utility component.

In a third embodiment of the present invention, a system for treating a gaseous feed stream is provided. The system includes a tubular containing a gaseous feed stream operatively connected to a selective component removal system including at least one swing adsorption process unit, wherein the selective component removal system is utilized to separate at least a portion of the gaseous feed stream to form a utility stream; and a utility component configured to receive and utilize the utility stream, wherein the utility stream is compatible with the utility component.

BRIEF DESCRIPTION OF THE DRAWINGS

The foregoing and other advantages of the present technique may become apparent upon reading the following detailed description and upon reference to the drawings in which.

DETAILED DESCRIPTION

Figure 1:
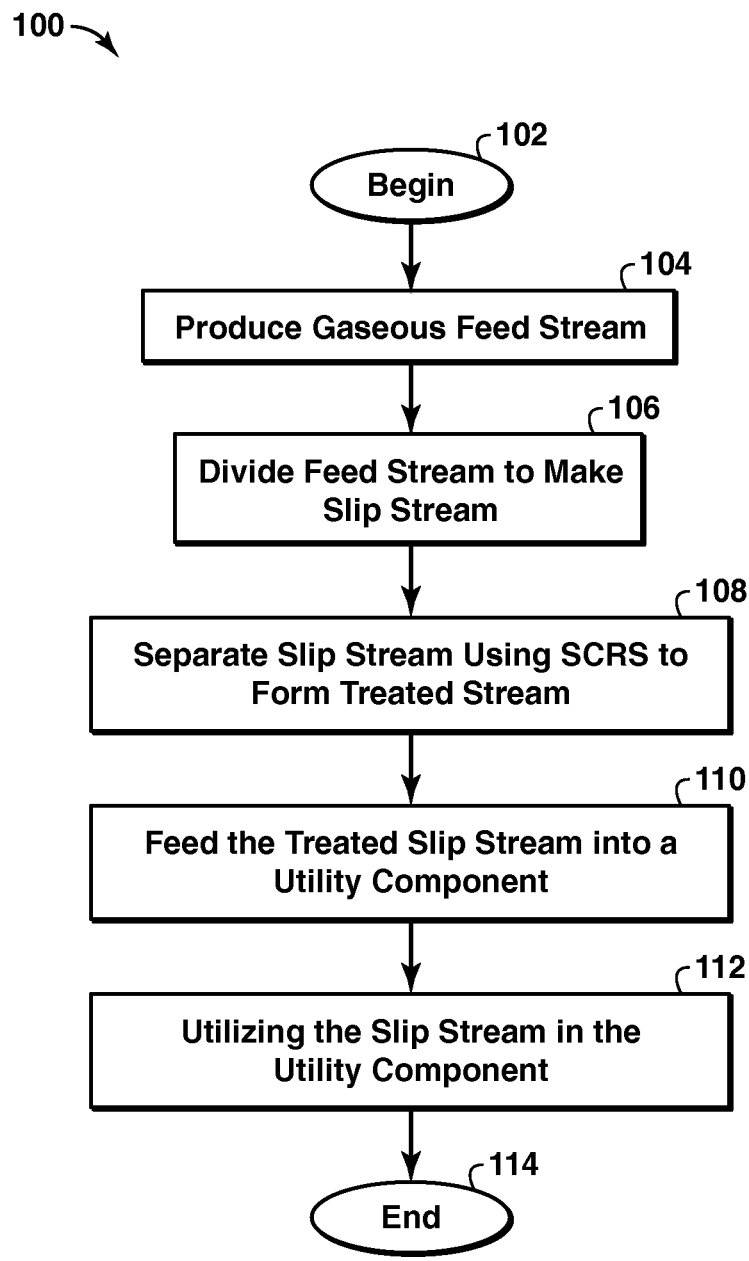
FIG. 1 is an exemplary flow chart of a process of managing a process plant in accordance with certain aspects of the present invention.

In the following detailed description and example, the invention will be described in connection with its preferred embodiments. However, to the extent that the following description is specific to a particular embodiment or a particular use of the invention, this is intended to be illustrative only. Accordingly, the invention is not limited to the specific embodiments described below, but rather, the invention includes all alternatives, modifications, and equivalents falling within the true scope of the appended claims.

The term "gaseous feed stream" as used herein refers to any gaseous stream or gas dominant stream originating from a man-made process or a terrestrial gaseous source (e.g. a hydrocarbon reservoir, a natural gas production stream, an associated gas stream, or a syngas feed stream), but does not include atmospheric air or streams of gas primarily derived from the atmosphere.

The term "slip stream" or "gaseous slip stream" means a volumetric portion of a gaseous feed stream and is generally less than half of the total volume of gas being handled. A "slip stream" is a volumetric fraction of a primary gaseous stream such as a gaseous feed stream and has generally the same composition as the primary gaseous stream.

The term "utility stream" (e.g. "utilities") means (unless otherwise specified) anything consumed in a facility or process unit including any fluid (gas or liquid) required in order to operate the overall compressor or gas processing equipment of the facility or process unit. Some common examples of utility streams can include fuel gas, seal gas, instrument and control gas, nitrogen or inert gas, blanket gas, hydraulic fluids, pneumatic systems, water (including non-potable water), diesel or gasoline to run turbines or boilers or any other fluid required to run equipment for a given process (e.g. compression equipment).

The term "swing adsorption process" includes processes such as pressure swing adsorption (PSA), thermal swing adsorption (TSA), and partial pressure swing or displacement purge adsorption (PPSA), including combinations of these processes. These swing adsorption processes can be conducted with rapid cycles, in which case they are referred to as rapid cycle thermal swing adsorption (RCTSA), rapid cycle pressure swing adsorption (RCPSA), and rapid cycle partial pressure swing or displacement purge adsorption (RCPPSA). The term swing adsorption also includes these rapid cycle processes. Some examples of swing adsorption processes and their application to natural gas separations are provided in U.S. Ser. No. 60/930,827, U.S. Ser. No. 60/930,826, U.S. Ser. No. 60/931,000, and U.S. Ser. No. 60/930,993, and U.S. Ser. No. 60/930,998, which are hereby incorporated by reference.

Pressure swing adsorption (PSA) processes operate on the principle that gases under pressure tend to be adsorbed within the pore structure of microporous adsorbent materials or within the free volume of polymeric materials. The higher the pressure, the more gas is adsorbed. When the pressure is reduced, the gas is released, or desorbed. PSA processes can be used to separate gases in a mixture because different gases tend to fill the micropore or free volume of the adsorbent to different extents. If a gas mixture, such as natural gas, for example, is passed under pressure through a vessel containing polymeric or microporous adsorbent that fills with more nitrogen than it does methane, part or all of the nitrogen will stay in the sorbent bed, and the gas coming out of the vessel will be enriched in methane. When the bed reaches the end of its capacity to adsorb nitrogen, it can be regenerated by reducing the pressure, thereby releasing the adsorbed nitrogen. It is then ready for another cycle.

Temperature swing adsorption (TSA) processes operate on the same principle as PSA processes. When the temperature of the adsorbent is increased, the gas is released, or desorbed. By cyclically swinging the temperature of adsorbent beds, TSA processes can be used to separate gases from a mixture when used with an adsorbent that selectively picks up one or more of the components in the gas mixture.

Rapid cycle pressure swing adsorption (RCPSA) can be constructed with a rotary valving system to conduct the gas flow through a rotary adsorber module that contains a number of separate adsorbent bed compartments or "tubes," each of which is successively cycled through the sorption and desorption steps as the rotary module completes the cycle of operations. The rotary sorber module is normally comprised of multiple tubes held between two seal plates on either end of the rotary sorber module wherein the seal plates are in contact with a stator comprised of separate manifolds wherein the inlet gas is conducted to the RCPSA tubes and the processed purified product gas and the tail retentate gas exiting the RCPSA tubes are conducted away from the rotary sorber module. By suitable arrangement of the seal plates and manifolds, a number of individual compartments or tubes may pass through the characteristic steps of the complete cycle at any given time. In contrast, with conventional PSA, the flow and pressure variations, required for the RCPSA sorption/desorption cycle, changes in a number of separate increments on the order of seconds per cycle, which smoothes out the pressure and flow rate pulsations encountered by the compression and valving machinery. In this form, the RCPSA module includes valving elements angularly spaced around the circular path taken by the rotating sorption module so that each compartment is successively passed to a gas flow path in the appropriate direction and pressure to achieve one of the incremental pressure/flow direction steps in the complete RCPSA cycle.

To prepare a gaseous feed stream for use in utilities or utility components, classes of separation applications that may be performed include dew point control, sweetening/detoxification, corrosion protection/control, dehydration, heating value control, conditioning, and purification. A few examples of utilities that encompass one or more classes of applications are generation of fuel gas, seal gas, non-potable water, blanket gas, instrument and control gas, refrigerant, inert gas, and hydrocarbon recovery.

Embodiments of the present invention selectively remove individual or groups of compounds from a gaseous slip stream through selective swing adsorption processes to produce utility streams that each contain one or more of the components present in the gaseous slip stream. The utility streams can be used for any purpose where a specific component or components of a stream are needed or need to be removed.

Whereas a gas processing facility typically will contain multiple large, traditional bulk separation methods that can supply the various gaseous utility streams required to support the facility, embodiments of the present invention may provide utility gas generation wherever tie-in to an existing gas processing plant unit is not practical or there does not exist the infrastructure to tie into such a plant (i.e., no gas processing plant). Exemplary applications include remote oil and gas production fields in remote geographic locations such as in the desert, in the arctic, subsea, and offshore.

In some exemplary embodiments of the present invention the gaseous feed stream being processed using the disclosed systems and methods is at a lower pressure (e.g. less than 100 bar), conventional separation processes can also be used to condition the feed gas to ensure that the molecular composition of the gas stream will not condense at the temperatures and pressure conditions found in the seals of a centrifugal dry seal compressor. It is possible to use conventional separation processes such as absorption, phase separation, and distillation to condition the gas stream because the pressure is less than 100 bar. Conventional separation processes (e.g. membrane separation, amines, etc.) are employed at pressures well below 100 bar. At pressures near 100 bar the application of conventional separation processes can be quite challenging (and in some instances impossible). When conventional separation processes are used to tailor the composition of a sour or sweet natural gas stream so that it will not enter a two phase region in the temperature and pressure conditions across the seals of a dry seal compressor, heavy hydrocarbons with carbon numbers greater than 4 are usually removed from the steam. In many applications it can be advantageous to remove more than 50% of the $C_{4+}$ hydrocarbons from the stream. More preferably, greater than 90% of the $C_{4+}$ hydrocarbons are removed from the stream.

Turning now to the drawings, and referring initially to FIG. 1, an exemplary flow chart of a process of managing a process plant in accordance with certain aspects of the present invention is provided. The process 100 begins at 102. A gaseous feed stream is produced at 104. The gaseous feed stream may be a compressor discharge stream, a process gas stream, or other similar stream, but not an atmospheric gaseous stream such as air. Preferably, the gaseous feed stream is at a pressure above the critical point of the stream (note that this presents additional challenges with conventional gas separation techniques). As understood in the art, critical point refers to a pressure-temperature point above which liquid cannot exist as a unique separate phase and the system is often referred to as a dense fluid or dense phase to distinguish it from normal vapor or liquid. The gaseous feed stream is divided 106 to form a gaseous slip stream, which is then separated 108 using a selective component removal system (SCRS) having at least one swing adsorption process unit to form a utility stream. The utility stream is then fed into a utility component 110 and utilized therein 112. The utility stream is compatible with the utility component and may undergo additional treatment or conditioning. The process ends at 114.

The utility component 110 is any device that utilizes a dry gas stream to operate and includes at least one of a compressor, a dry seal compressor, a compressor string, a turbo-expander compressor, a turbo-expander generator, a pump, a fired steam boiler, a fired process heater, a gas engine, a hermetically sealed direct-drive electric motor, turbomachinery equipped with magnetic bearings, gas-operated instruments and controls, or a gas turbine. The utility stream is utilized in the utility component 110 in whatever manner is most useful, but may be used, for example, as a gas for a dry gas seal in the utility component.

In some embodiments of the disclosure, the gaseous feed stream may include at least one hydrocarbon component and may be at a high pressure such as from at least about 50 bar to about 600 bar, or from about 100 bar to about 500 bar, or from about 200 bar to about 320 bar. When the gaseous feed stream contains natural gas or associated gas, a product stream may be produced. Such a product stream is at least a purified gas stream that is transferred to market by pipeline, or a liquefied natural gas, or natural gas liquids, or a gas stream that is reinjected into the subsurface in locations such as the producing field or an underground aquifer, or a combination of these different products.

The gaseous slip stream may be less than fifty percent of the volume of the gaseous feed stream and will be preferably less than about ten percent of the volume of the gaseous feed stream. As such, the slip stream will have a molar flow rate less than half that of a gaseous hydrocarbon containing feed stream. The slip stream can be generated from the gaseous hydrocarbon containing feed stream with a flow splitter or equivalent device that divides the gas stream being processed into a fraction that will be processed to provide a utility gas stream and a fraction that will be processed or used as a product stream.

Additionally, in a preferred form of this embodiment the swing adsorption process unit would be operated to produce the utility stream as a seal gas stream for a dry seal compressor. One important application of dry seal compressors is to compress sour gas streams so that they can be reinjected into the producing formation or into another underground formation. For these applications the compressor discharge pressure must exceed the pressure in the underground formation. Pressures in underground formations are usually in excess of 100 bar and often in excess of 250 bar. In these applications it is preferable to operate the swing adsorption process unit operated with an inlet (slip stream) in a range from at least about 100 bar to at least about 500 bar and more preferably in a range from 200 to 320 bar, which is dependent on the compressor suction or sealing pressure. These pressures are in excess of those that have been used in conventional swing adsorption units.

Figure 2A:
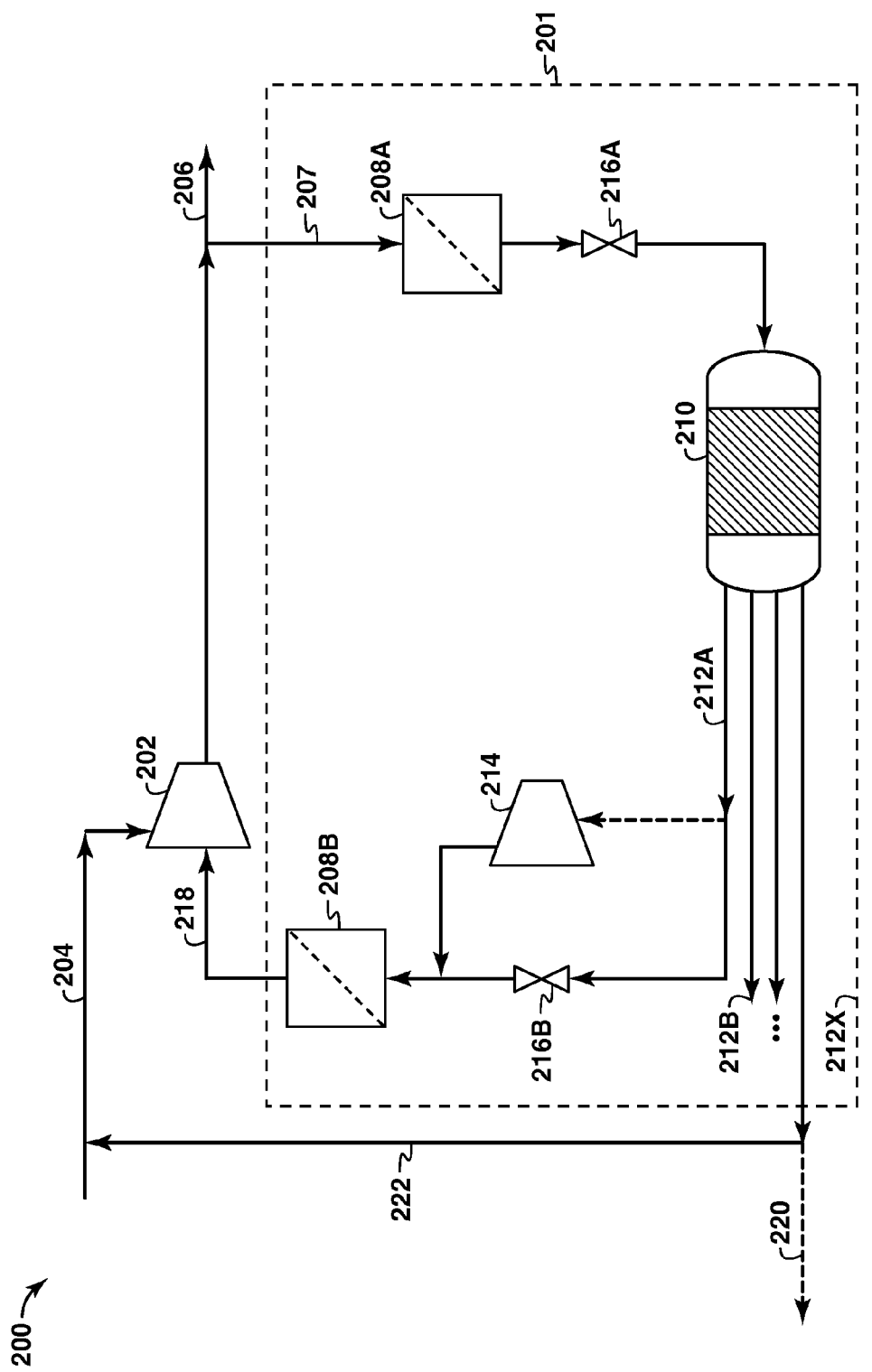
FIGS. 2A-2B are exemplary process layouts utilizing a compressor with the process of FIG. 1.
Figure 2B:
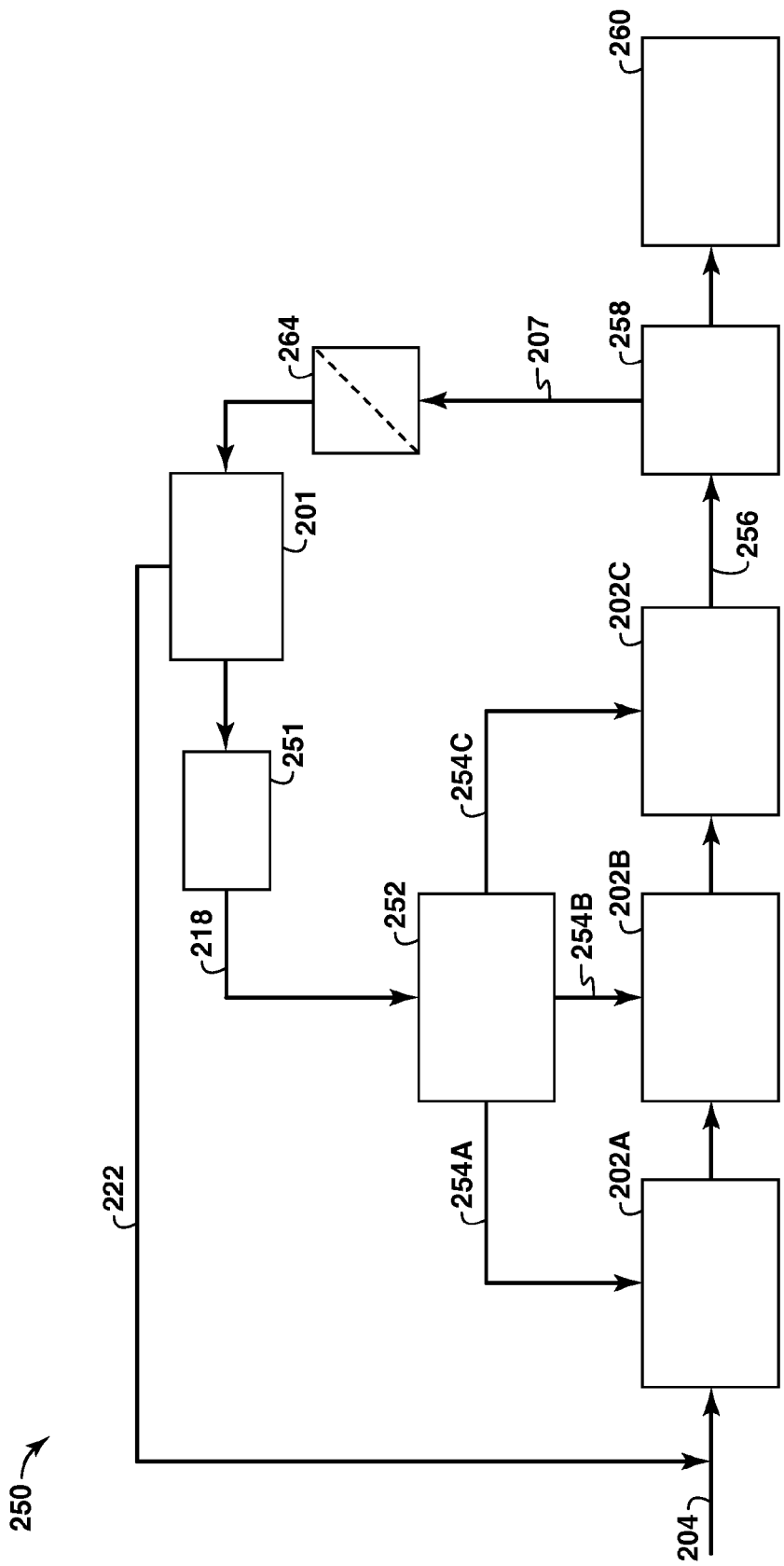

FIGS. 2A-2B are exemplary process layouts utilizing a compressor with the process of FIG. 1. As such, FIGS. 2A-2B may be best understood with reference to FIG. 1. As shown in FIG. 2A, the process layout 200 includes a compressor 202, a process stream 204 feeding the compressor 202, a compressor discharge stream 206 from the compressor 202, a slip stream 207 divided from the discharge stream 206, and a rejection stream 222 that may be combined with process stream 204. The streams 204 and 206 may each be considered a "gaseous feed stream." The process further includes a selective component removal system (SCRS) 201 comprising filters 208A and 208B, control valves or flow/pressure control devices 216A and 216B, a swing adsorption process unit 210, and/or an expander 214. The swing adsorption process unit 210 produces at least a utility stream 212A and secondary streams 212B-212X, one of which may partially be a disposal stream 220. The utility stream 212A may be at least partially expanded in the expander 214 and filtered in the filter 208B to form a treated utility stream 218. The treated utility stream 218 is the result of the SCRS 201 and is fed into the seals of the compressor 202 for utilization as a seal gas or other utility.

The swing adsorption process unit 210 may be cycled by pressure, temperature or partial pressure purge displacement, and may be a rapid-cycle unit. In one embodiment, the slip stream 207 from the compressor discharge stream 206 may be directed through the filter 208A and control valve 216A into the adsorption unit 210. The filter 208A may remove any extraneous particles that could contaminate and deactivate (e.g. plug) the adsorbent in the adsorption unit 210. The control valves 216A-216B may regulate the flow of fluids fed into the SCRS 201. The various streams may be connected by tubulars, which may be constructed from corrosion resistant alloys, carbon steel, or other materials, but preferably the tubulars are capable of handling fluids at high pressure, such as above about 100 bar.

The swing adsorption process unit 210 may produce individual streams 212A, 212B-212X containing the separated components from the slip stream 207, where the reject stream 212X contains the waste compounds for disposal 220. In one embodiment, stream 212X could be recycled back into the compressor 202 suction or into the process stream 204 down stream of a pressure let down for disposal.

The process stream 204 may operate at anywhere from at least about 10 bar to at least about 600 bar. In one exemplary embodiment, the process stream 204 may be a production stream from a subterranean reservoir containing light and heavy hydrocarbons ($C_1$ to $C_{10}$), mercaptans, sulfur dioxide, hydrogen sulfide, carbon dioxide, carbonyl sulfide, steam, nitrogen, and other components and any combination thereof. Alternatively, the process stream 204 may be a compressed stream from a utility component such as a compressor 202, which may be pressurized to 300 bar, 400 bar, 500 bar, 600 bar, or higher and may include components similar to the production stream above, but may additionally include lube oil or similar components picked up in the compression process or other process.

Referring now to FIG. 2B, the SCRS 201 is shown with reference to an exemplary sour gas process 250. The compressors 202A, 202B, and 202C may be arranged in a compressor string and generate a single high pressure discharge 256 to an injection well manifold 258. From the manifold 258, a stream may be injected through injection wells 260. A portion of the stream from the manifold 258 may be sent to the SCRS 201 via a filter 264 as a slip stream 207. From the SCRS 201, the stream may go to an accumulator 251, then the treated utility stream 218 may be fed into a seal gas control unit or panel 252. The accumulator 251 may be a holding vessel to meet certain varian flow requirements and surge capacity issues during operation. The seal gas control panel 252 may then direct the flow of low pressure seal gas (e.g. utility stream) 254A to a low pressure compressor 202A, direct medium pressure seal gas 254B to a medium pressure compressor 202B, and direct high pressure seal gas 254C to a high pressure compressor 202C. Additionally, the SCRS 201 may produce a rejection stream 222 that may be fed back to process stream 204. In such an arrangement, the compressors 202A, 202B, and 202C may be high pressure sour gas injection compressors, the discharge 256 may be a sour gas injection discharge. A person of ordinary skill in the art recognizes that the SCRS 201 may be utilized in a variety of applications beyond acid gas/sour gas injection, some of which are disclosed herein.

Figure 3:
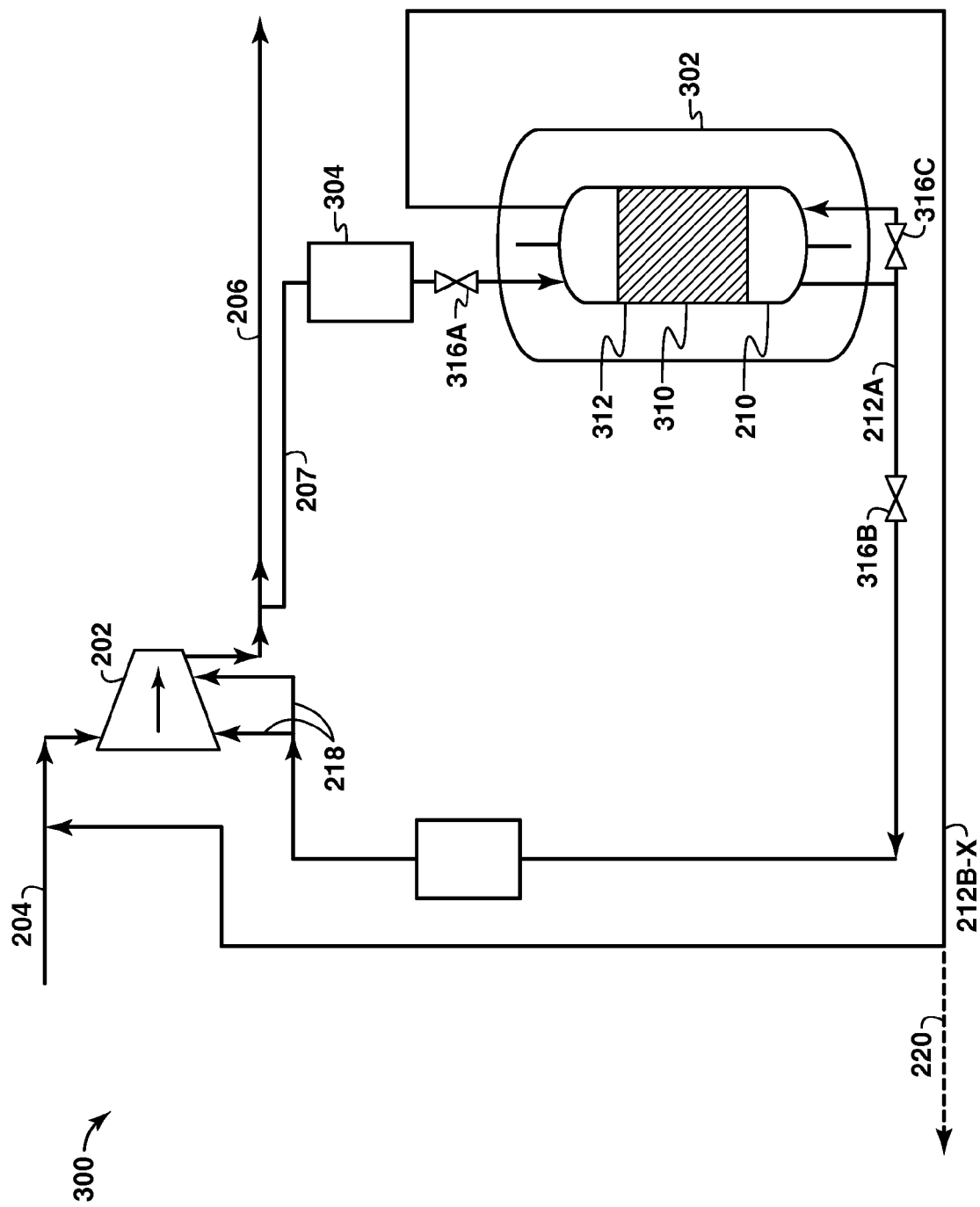
FIG. 3 is an exemplary schematic of a process layout of the present invention including a high pressure vessel surrounding the swing adsorption process unit of FIG. 2.

FIG. 3 is an exemplary schematic of a process layout of the present invention including a secondary pressure vessel 302 surrounding the swing adsorption process unit 210. The process may be similar to the process of FIGS. 1 and 2A-2B, but with the addition of the secondary pressure vessel 302. As such FIG. 3 may be best understood with reference to FIGS. 1 and 2A-2B. The swing adsorption process unit 210 can be placed in a pressure vessel 302 that can be pressurized in order to reduce the overall differential pressure from the adsorption unit 210 to its surrounding environment in order to reduce the differential pressure on the seals in the adsorption unit 210. Box 304 may include a filter 208A, expander 214, valve 216A, or some combination of such gas handling and treating equipment.

The swing adsorption process unit 210 utilizes an adsorbent bed 310 contained within a housing 312. The bed 310 is composed of at least a beaded adsorbent or structured adsorbent. If a heating or cooling fluid is used in the swing adsorption process unit the bed 310 may also contain heating or cooling passages or tubes (not shown), which may be attached to the housing 312 in a manner that prevents contacting the adsorbent with heating or cooling fluids. Specifically, heating may be by electric tracing and cooling may be by a cooling jacket. Valve or valves 316A may control the periodic flow of feed to the swing adsorption process unit 210 (which is derived from the slip stream 207) and products (such as the utility stream 212A and the secondary, reject or other product streams 212B-212X) into and out of the bed 310. Other valves (not shown) may also be provided to control the periodic flow of heating and cooling fluids into and out of the bed 310.

The choice of valve technologies depends in part on the pressure of the inlet stream, the composition of the inlet stream, the temperature of the inlet stream and the temperature of any required heating or cooling fluids. In all cases the valves 216A, 316A, 316B, 316C have a sealing surface or packing that prevents leakage of components out of the valve body. The amount of leakage out of the valve body depends on the differential pressure between the atmosphere surrounding the valve and the stream or streams controlled by the valve. When the feed stream is fed at high pressures (e.g. greater than 70 bar) the leakage rate from the valves can be an important safety and operational concern. For example, when the adsorption unit 210 processes $H_2S$ containing sour or acid gas even small amounts of leakage can be a significant safety and operational concern.

In one exemplary embodiment of the present invention, valve or valve sets 316A are enclosed in individual housings pressurized to a pressure greater than 10% of the slip stream 207 and in a more preferred embodiment the housings are pressurized to a pressure greater than 90% of the slip stream 207. An alternative exemplary embodiment of the present invention comprises a secondary pressure vessel 302 around the entire swing adsorption process unit 210 (including valves 316). In one exemplary embodiment the secondary pressure vessel 302 is pressurized to a pressure greater than 10% of the slip stream 207 and in another exemplary embodiment the secondary pressure vessel 302 is pressurized to a pressure greater than 90% of the slip stream 207.

Figure 4:
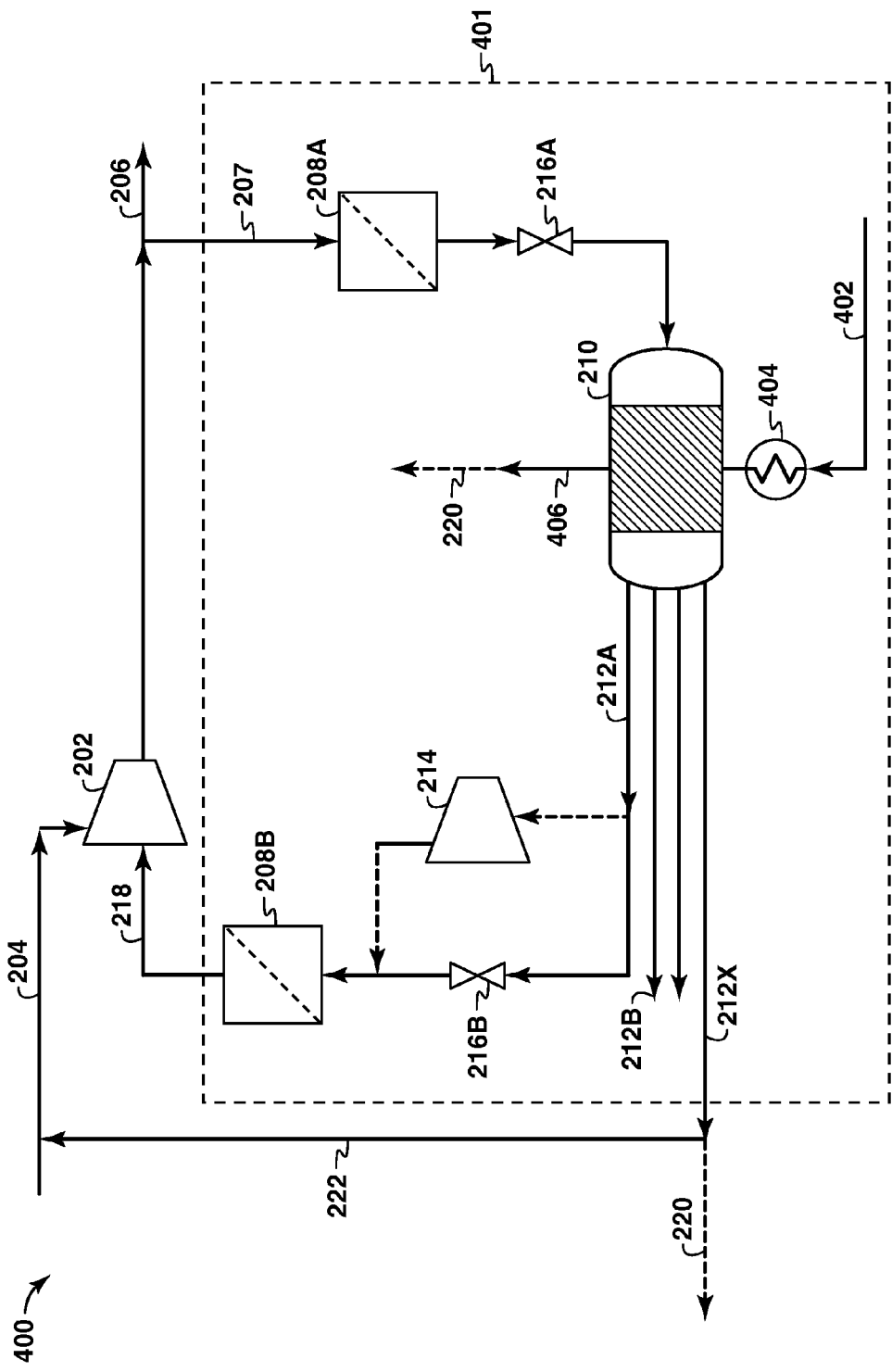
FIG. 4 is an exemplary process layout of the selective component removal system (SCRS) of FIG. 2 utilizing thermal pressure swing adsorption process (thermal PSA) rather than pressure swing adsorption process.

FIG. 4 is an exemplary process layout of FIG. 2A utilizing thermal pressure swing adsorption (thermal PSA) rather than pressure swing adsorption. As such, FIG. 4 may be best understood with reference to FIGS. 1-2A. The process layout 400 utilizing thermal PSA includes a compressor 202, a process stream 204 feeding the compressor 202, a compressor discharge stream 206 from the compressor 202, and a slip stream 207 divided from the discharge stream 206. The process layout further includes a selective component removal system (SCRS) 401 comprising filters 208A and 208B, control valves 216A and 216B, a swing adsorption process unit 210, outlet streams 212A-212X from the adsorption unit 210, and at least one heat source 404 and heat sinks (not shown) to provide the heating and cooling necessary to effect the separation. A fluid stream 402 may be heated at heat source 404, then recycled or sent to waste stream 220 through remainder stream 406. Instead of relying solely on pressure energy, thermal energy would also be used to effect the separation. The thermal-swing adsorption process unit 210 can be used in combination with a compressor 202 or without a compressor as shown below in FIG. 5. The waste stream 220 may be returned to the compressor suction stream 204 via line 222 or simply discarded.

Figure 5:
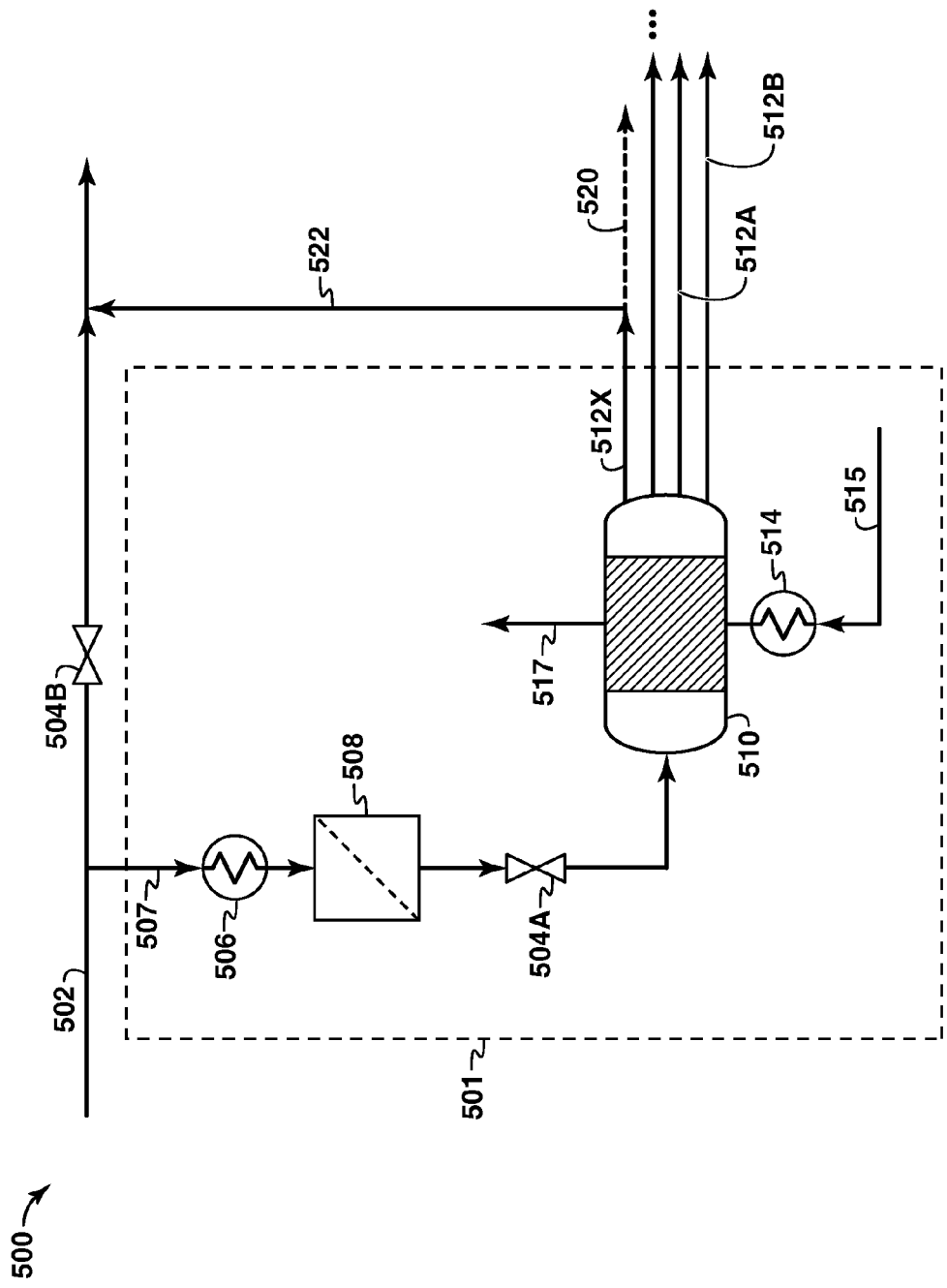
FIG. 5 is another exemplary process layout of a selective component removal system (SCRS) with a combined pressure-swing/rapid cycle pressure swing and thermal-swing adsorption process unit.

FIG. 5 is another exemplary process layout selective component removal system (SCRS) with a combined pressure-swing/rapid cycle pressure swing and thermal-swing adsorption unit. The process 500 includes a process stream 502, a slip stream 507 off of the process stream 502, and an SCRS 501. The SCRS 501 includes a heat exchanger (heater or cooler) 506, a filter 508, and a control valve 504A in combination with an adsorption unit 510, which may be a combined pressure-swing/rapid cycle pressure swing and thermal-swing adsorption unit. There may also be a heater 514 and lines associated therewith 515, 517. After treatment in the adsorption unit 510, there will be at least a first utility stream 512A and optionally additional utility streams 512B-512X, which may be sent to a waste stream 520, or recycled through stream 522 to recombine with process stream 502.

The processing system 500 may utilize a high pressure process stream 502 with pressure let down to facilitate disposal of waste product 522 back into the process 502. Some portion of the unused waste or product stream 522 may be returned either to suction of a compressor 202 similar to that shown in FIG. 2A for pressure-swing or after a pressure drop in the process in order to facilitate the waste flowing back into the process as shown in FIG. 5.

Figure 6:
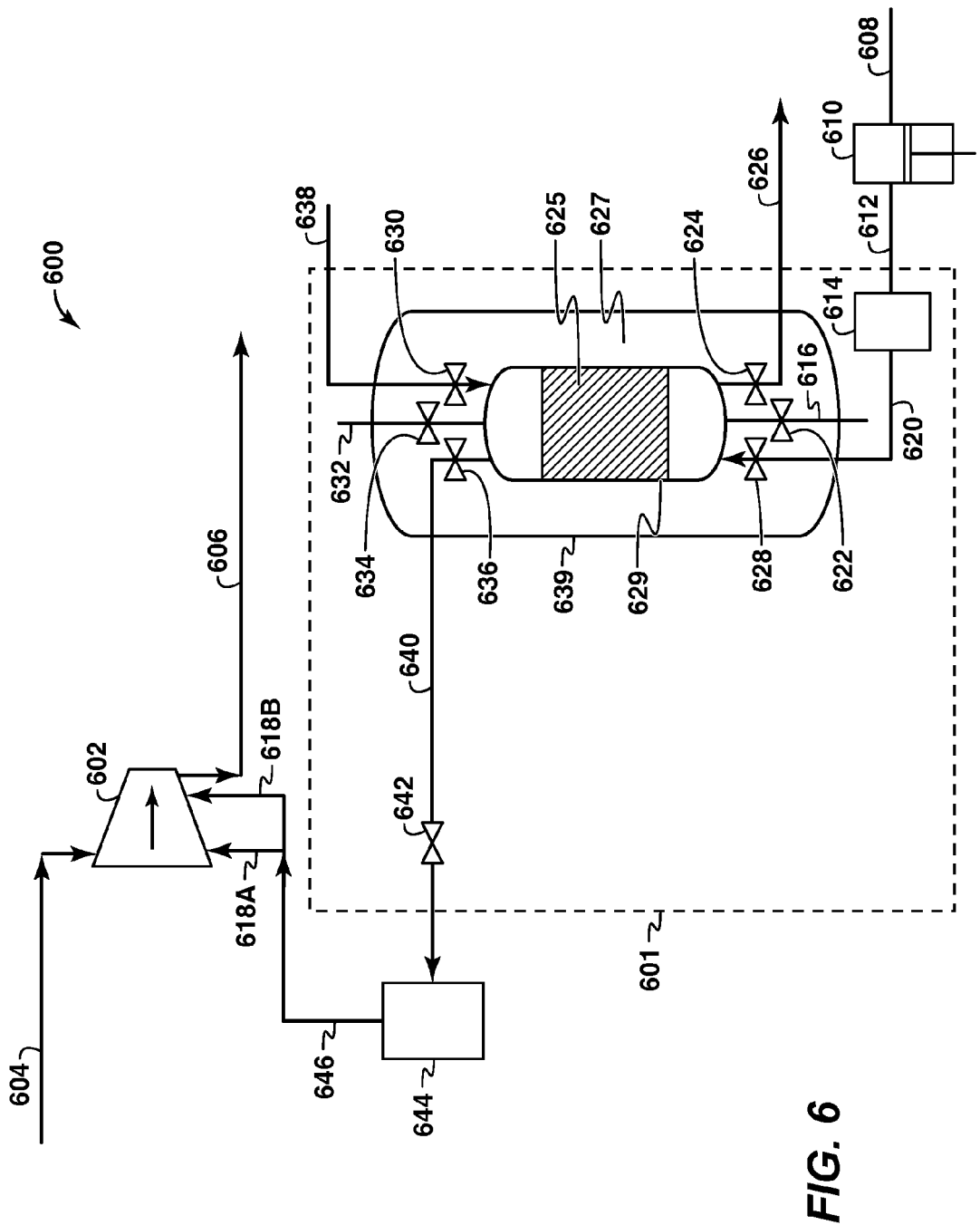
FIG. 6 is an exemplary illustration of a process layout of a selective component removal system (SCRS) for preparing a utility stream (e.g. seal gas) for a centrifugal dry seal compressor.

FIG. 6 is an exemplary illustration of a process layout of a selective component removal system (SCRS) for preparing a utility stream (e.g. seal gas) for a centrifugal dry seal compressor. As such, FIG. 6 may be best understood with reference to FIG. 2A. The process layout 600 may include a centrifugal dry seal compressor 602 which boosts the pressure of a process stream 604 yielding a compressed stream 606. Treated utility streams (e.g. seal gas streams) 618A and 618B are generated from stream 608 by a selective component removal system (SCRS) 601. Stream 608 may be a slip stream taken from process stream 604 or from another process such as fuel gas. A reciprocating compressor 610 may be used to compress stream 608 to a pressure above or slightly above the highest pressure needed for seal gas streams 618A and 618B. To remove oil vapor and any other molecular species that might condense in the seal of compressor 602, stream 612 may be treated in an SCRS 601 having a swing adsorption process unit 627. To prepare stream 612 for processing by the swing adsorption process unit 627 it is optionally fed to unit 614 that conditions the gas to form conditioned stream 620. The conditioned stream 620 may be fed to the swing adsorption process unit 627 having a valve or a set of valves 628 which may control (e.g. pulse) the rate of the conditioned feed stream 620 into the adsorption bed 625. An exit valve or a set of exit valves 636 may periodically open and close to allow a utility stream 640 to leave the swing adsorption unit 627. The utility stream 640 may then be fed to safety and unit isolation devices 642 such as unit isolation valves, flow checks, or pressure relief valves may optionally be provided to improve operability. An accumulator vessel 644 may also optionally be provided to further reduce flow or pressure fluctuations. Optionally, the accumulator can include a heat exchanger (not shown). Resulting stream 646 is then the treated utility stream (seal gas) produced by the selective component removal system, which may be split into streams 618A and 618B for use in the dry gas seals of the compressor 602. Additionally, a secondary stream 638 may enter the swing adsorption unit 627 via a secondary inlet valve or a set of inlet valves 630, then exit the swing adsorption unit 627 via a secondary exit valve or valves 624 that may periodically open and close to allow the reject (e.g. secondary product) stream or set of streams 626 to leave the swing adsorption unit 627.

In one exemplary embodiment of the process 600, the swing adsorption unit 627 uses a thermal swing adsorption process. In this case, a set of valves 634 and 622 may be provided to pulse the flow of heating or cooling fluids that enter and leave the swing adsorption unit 627 through streams 616 and 632. Electrical heating or jacket cooling (not shown) may also be used to provide the temperature swings. In another exemplary embodiment, the swing adsorption unit 627 may use a partial pressure purge displacement process. In this case a valve or set of valves 630 is provided to pulse the flow of the purge displacement stream 638 into the adsorption bed 625. The adsorption bed 625 is contained within a pressure vessel 629. Optionally, this vessel 629 and the associated valving is contained within a secondary pressure vessel 639. This secondary pressure vessel 639 is designed to mitigate the significance of leaks through seals in the valves 628, 636, 634, 630, 624, and 622. This can be especially important when rotary valves are used. When rotary valves are used, valves 624, 628, and 622 can all be incorporated into a single rotary valve body (e.g. they do not have to be separate valve bodies). Similarly, any optional valves used (636, 630, and 634) can be incorporated with them into a single rotary valve body. To provide a more continuous flow in utility stream 640, several swing adsorption units 627 can be employed. If several swing adsorption units are employed, the several resulting utility streams 640 may be merged.

In some exemplary embodiments of the process 600, the process stream 604 may be a sour or acid gas stream being compressed for injection into an underground reservoir and may have a pressure in a range from 10-100 bar. The compressed stream 606 may have a pressure in a range from 100-800 bar with the ratio of pressures between stream 606 and 604 being greater than 2:1. In a preferred embodiment the pressure of stream 606 is greater than 250 bar. The centrifugal dry seal compressor 602 may have several compression stages. As such, the pressure in stream 608 is less than 100 bar. In the case where the process stream 604 is sour gas, a slip stream taken from it or the stream used to form it can be treated using conventional absorption, phase separation, and distillation processes to remove water and reduce the amount of $H_2S$ flowing into stream 608. It is also possible to treat the gas flowing in to stream 608 with a molecular sieve bed to remove water. Conventional separation processes can also be used to condition the gas being fed to stream 608 to ensure that the molecular composition of gas stream 608 will not condense at the temperatures and pressure conditions found in the seals of the centrifugal dry seal compressor 602. It is possible to use conventional separation processes such as absorption, phase separation, and distillation to condition the gas for stream 608 because the pressure is less than 100 bar.

Conventional separation processes are employed at pressures well below 100 bar. At pressures near 100 bar the application of conventional separation processes can be quite challenging (and in some instances impossible). When conventional separation processes are used to tailor the composition of a sour or sweet natural gas stream so that it will not enter a two phase region in the temperature and pressure conditions across the seals of compressor 602, heavy hydrocarbons with carbon numbers greater than 4 are usually removed from the steam. In many applications it can be advantageous to remove more than 50% of the $C_{4+}$ hydrocarbons from the stream that is used to form stream 608. More preferably, greater than 90% of the $C_{4+}$ hydrocarbons are removed from the stream used to form stream 608.

The cylinder of the reciprocating compressor 610 may be lubricated with oil that may be carried as a mist or vapor out of the compressor. The lubricating oil can contain additives which enhance its performance and many of these molecules can also be entrained as a vapor or mist in the compressed gas stream 612. The oil vapor, oil mist, or components of the lubricating oil coming out of the reciprocating compressor 610 can condense in the seals of the dry seal compressor 602. This becomes a significant problem when the pressure of the compressed stream 612 is greater than 100 bar. As such stream 612 is unsuitable for use as a utility stream (seal gas) for the dry seal compressor 602 when the required seal gas pressures are in excess of 100 bar. Conditioning in optional unit 614 may involve changing the temperature of the stream by heat exchange or can involve filtering particles or oil mist coming from the reciprocating compressor 610. The SCRS 627 can be designed to adsorb and remove the oil in the dense phase gas where filtration is insufficient.

Figure 7:
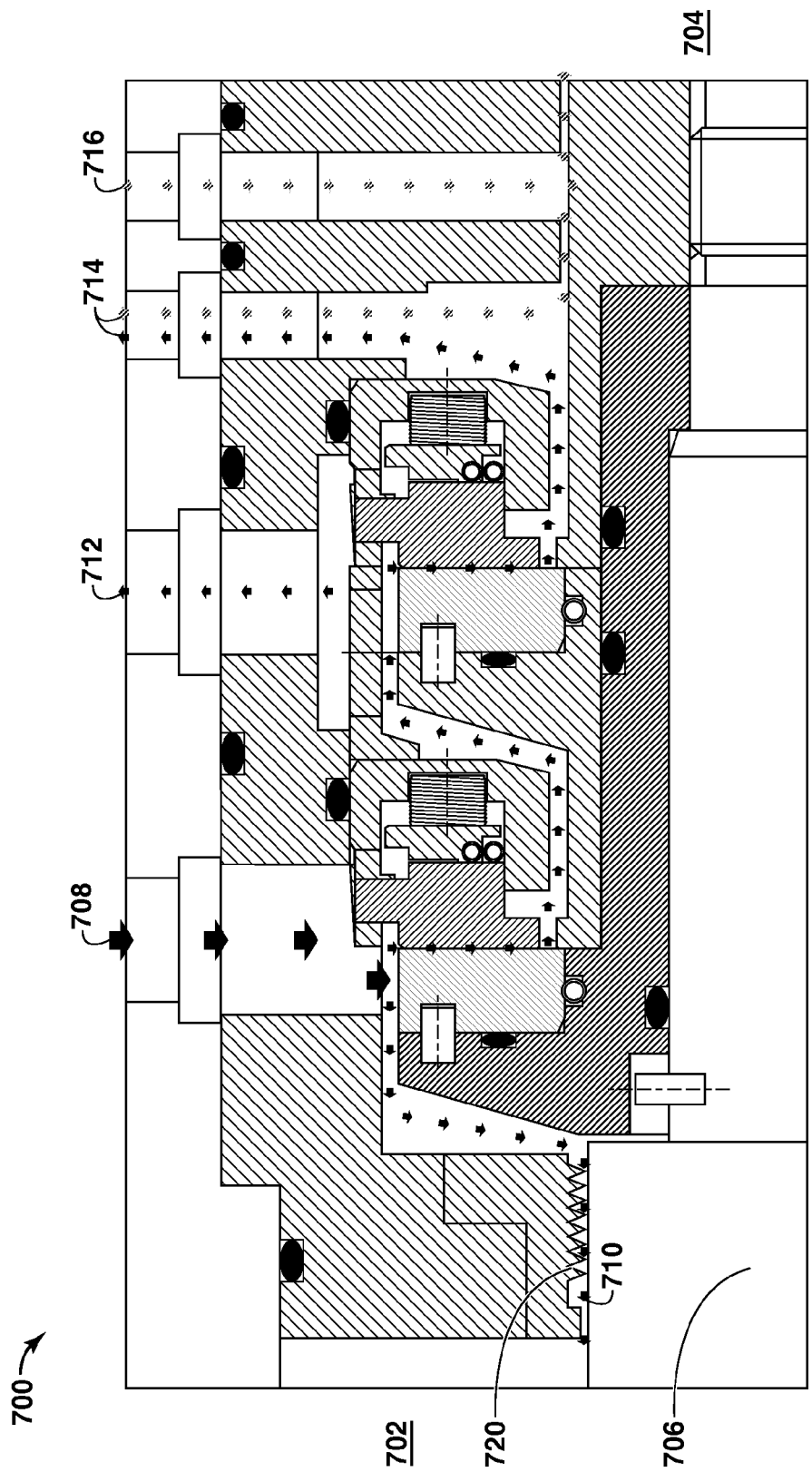
FIG. 7 is an exemplary illustration of a conventional dry gas seal system in a compressor.

FIG. 7 is an exemplary illustration of a conventional dry gas seal system in a compressor 202. The compressor 202 may be part of the process system 200, 250, 300, 400, or 600. Hence, FIG. 7 may be best understood with reference to FIGS. 2A, 2B, 3, 4, and 6. The system 700 includes a process side 702, a discharge (atmospheric) side 704, and a high pressure rotating equipment portion 706. Treated utility gas (e.g. dry seal gas, which may be treated gas 218, 618A, or 618B) enters the system 700 at 708 and exits at 710 and 712. The gas at 708 is at a sufficiently high pressure to operate the dry gas seal 722. The exit gas 710 should be at a sufficiently high pressure to resist pressure from the process side 702 and exit between the labyrinth seal 720 and the rotating equipment 706. The exit gas 712 is at approximately flare or atmospheric pressure. Gas stream 714 is also flue (e.g. vented to atmosphere) or flare gas and stream 716 is separation gas flow (generally nitrogen or air).

In one exemplary embodiment, the invention is used to address the desire to produce a non-condensing seal gas (e.g. utility gas) 708 for a high-pressure centrifugal compressor injecting into a reservoir gas containing any or all of the following: hydrocarbons from $C_1$ (methane) through $C_{10+}$ (decanes+), water, sour gas compounds (i.e., $H_2S$, $CO_2$, and other sulfur-containing compounds), and inerts (nitrogen, helium). In this service, a form of dew point control, the invention would remove compounds that would otherwise condense as the process gas is expanded across the compressor dry gas seal 722.

A slip stream from the discharge would be directed through a particle/liquid removal filter and then through the SCRS to selectively remove the condensable compounds. The treated stream would then be let down in pressure either with valve(s) or expander(s) to the desired seal gas pressure. An expander may also be used in place of any of the aforementioned pressure let down valves or devices to reduce the stream's pressure to the desired pressure while recovering useful work. The reject streams containing waste products and other streams (hydrocarbons, Nitrogen etc.) can then be dealt with on the basis of their utility. Waste streams such as unsaleable $CO_2$ and $H_2S$ could be recycled back to the compressor suction or other appropriate stream for disposal. Economically-valuable streams (i.e., hydrocarbons) can be recovered and sold or used for other utilities such as fuel gas or separation gas 716 etc.

EXAMPLES

In one example, compressed gas with the following composition and state downstream of a compressor is being reinjected:

|  | Mole Fractions |
|---|---|
| Methane | 0.5933 |
| Ethane | 0.1084 |
| Propane | 0.0579 |
| i-Butane | 0.0081 |
| n-Butane | 0.0157 |
| i-Pentane | 0.0041 |
| n-Pentane | 0.0037 |
| n-Hexane | 0.0019 |
| n-Heptane | 0.0007 |
| Nitrogen | 0.0108 |
| H2O | 0.0000 |
| H2S | 0.1622 |
| CO2 | 0.0324 |
| COS | 0.0001 |
| M-Mercaptan | 0.0002 |

Figure 8:
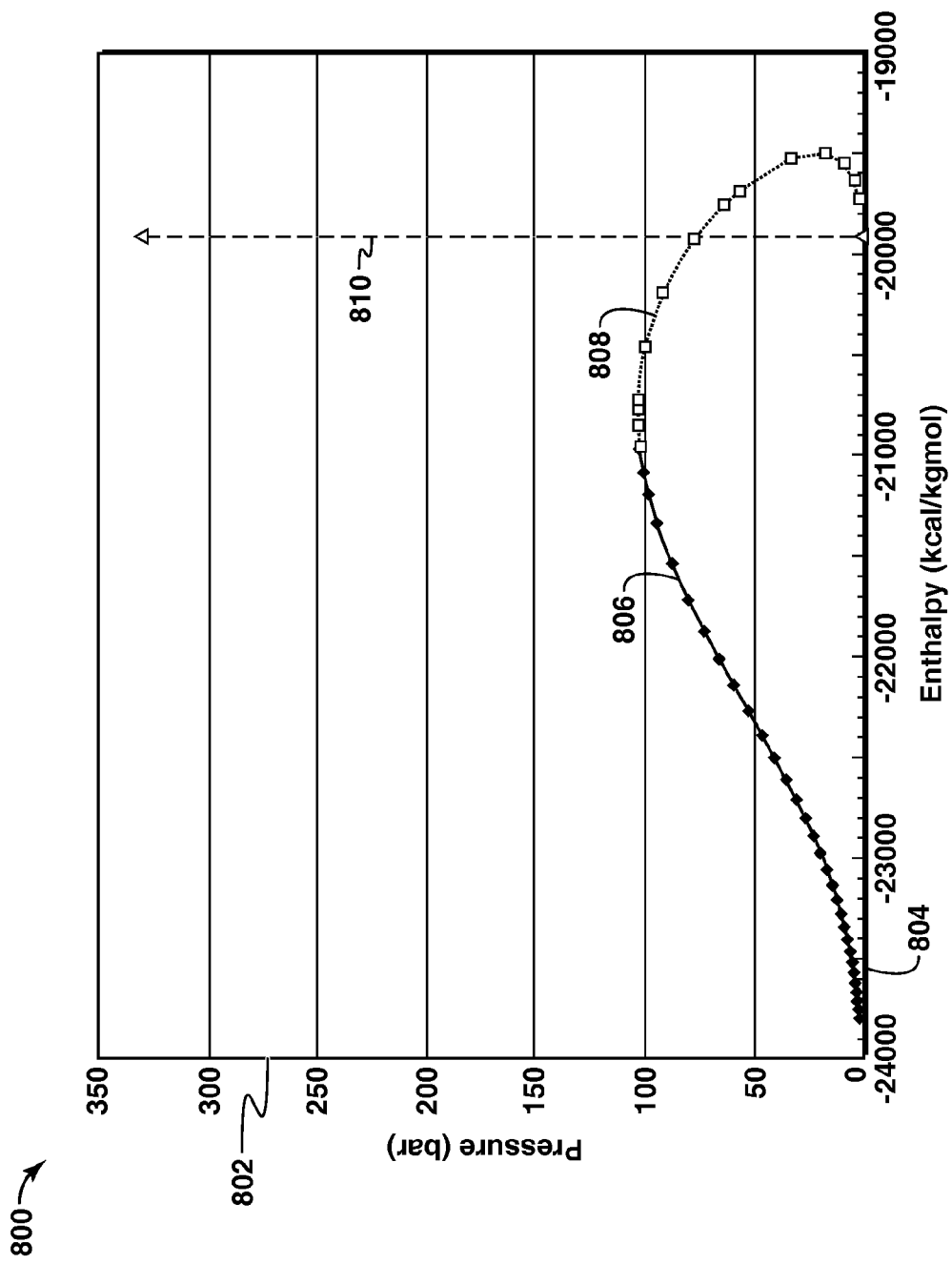
FIG. 8 is a graph depicting the phase envelope associated with an exemplary gaseous slip stream.

FIG. 8 is a graph depicting the phase envelope associated with the exemplary gaseous slip stream listed above taken directly from the compressor discharge and into the dry gas seals. In the graph 800, pressure 802 is in bar, enthalpy 804 is in kilocalories per kilogram moles (kcal/kgmol), the bubble point of the process fluid 806 is shown with diamonds, the dew point of the process fluid 808 is shown with squares, and the valve expansion point 810 is shown by a vertical line at about negative 19,900 kcal/kgmol. As shown, the gas will cool as it expands and drops in pressure. At about 77 bar the valve expansion point 810 crosses the dew point 808 resulting in the slip stream gas entering the 2-phase region as liquids condense. Such a result is highly problematic and often causes early failure of dry gas seals.

Figure 9:
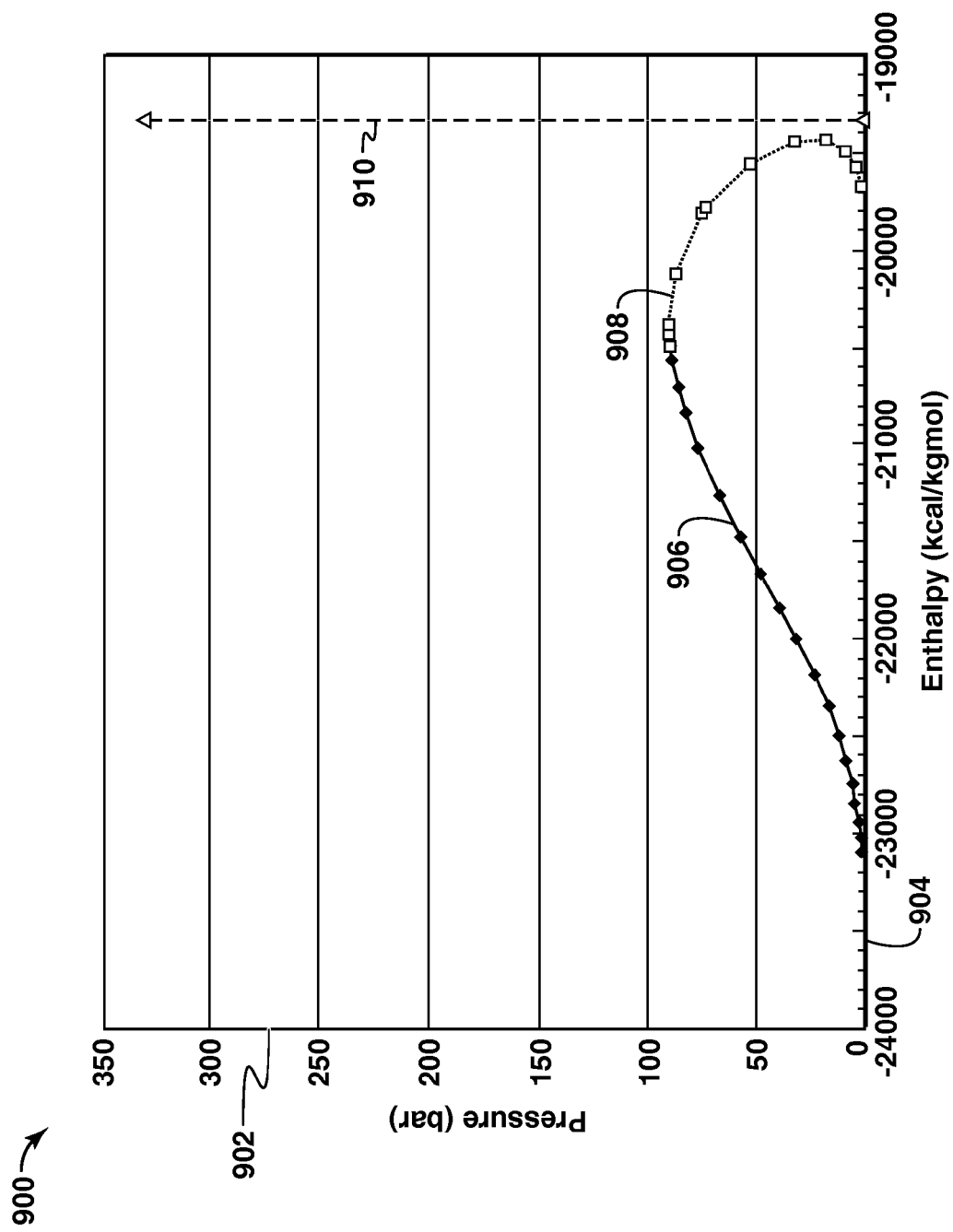
FIG. 9 is a graphic illustration depicting the phase envelope associated with an exemplary gaseous slip stream after treatment to form a treated gaseous slip stream.

FIG. 9 is a graphic illustration depicting the phase envelope associated with the exemplary gaseous slip stream listed above after separation 106 to form a treated utility stream via any one of the processes or systems 100, 200, 300, 400, and 600. In the graph 900, pressure 902 is in bar, enthalpy 904 is in kilocalories per kilogram moles (kcal/kgmol), the bubble point of the process fluid 906 is shown with diamonds, the dew point of the process fluid 908 is shown with squares, and the valve expansion point 910 is shown by a vertical line at about negative 19,350 kcal/kgmol. As shown, the phase envelope 906 and 908 has moved to the left resulting in the utility gas stream remaining in the gaseous state across the seal. Removal of the butanes and heavier hydrocarbons caused the shift. Hence, the utility gas (e.g. seal gas) can be used as the seal gas without danger of liquids condensing. The utility gas stream may be any one of utility gas stream 218, 512A, 618A and 618B.

Figure 10:
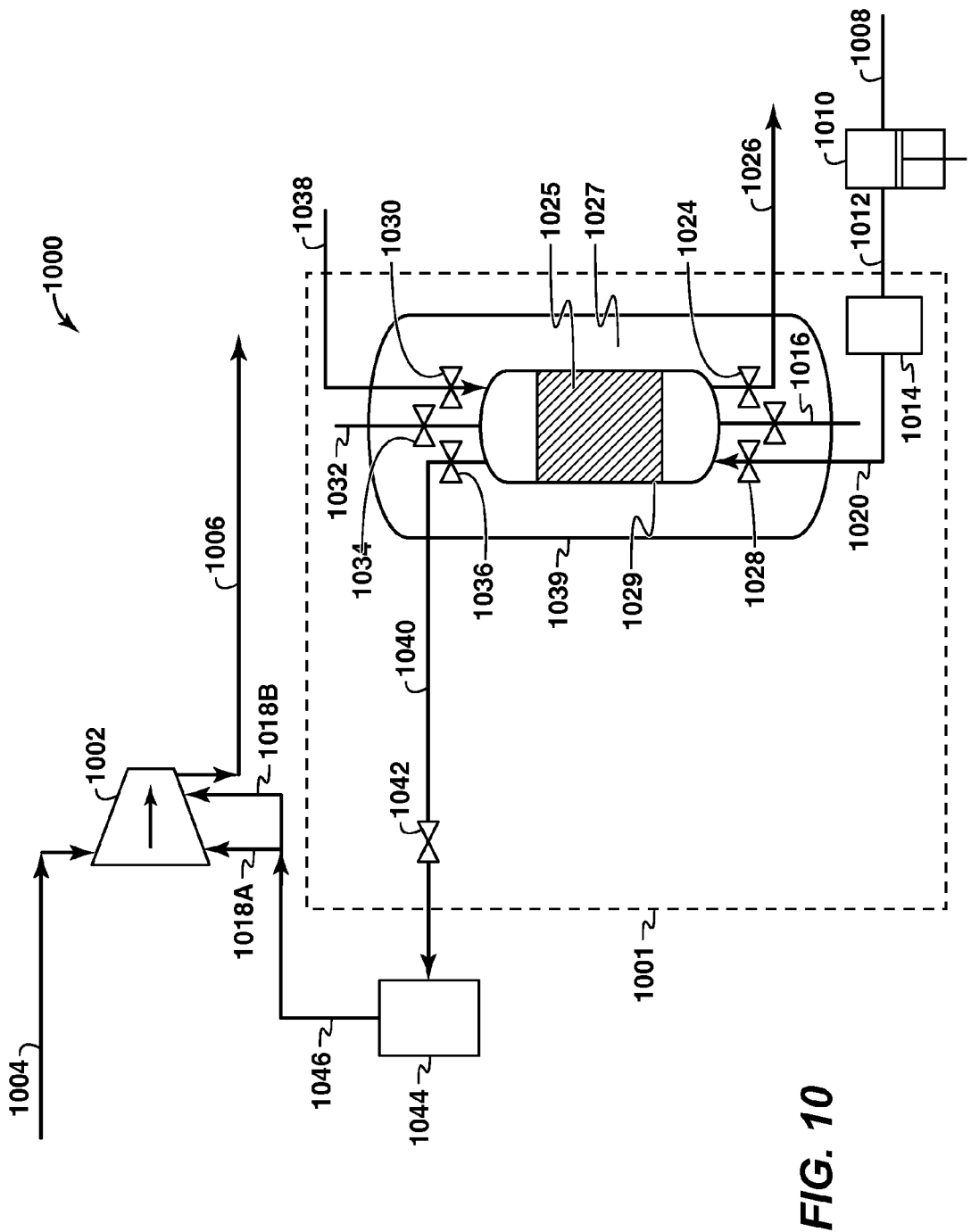
FIG. 10 is an exemplary illustration of a process layout of a selective component removal system (SCRS) for preparing a nitrogen rich utility stream (e.g. seal gas) for a high pressure centrifugal dry seal compressor.

FIG. 10 is an exemplary illustration of a process layout of a selective component removal system (SCRS) for preparing a nitrogen rich utility stream (e.g. seal gas) for a high pressure centrifugal dry seal compressor. As such, FIG. 10 may be best understood with reference to FIG. 2A. The process layout 1000 may include a high pressure centrifugal dry seal compressor 1002 which boosts the pressure of a process stream 1004 yielding a compressed stream 1006. Utility (e.g. seal gas) streams 1018A and 1018B are produced from nitrogen-rich gaseous stream 1008 using an SCRS 1001. Stream 1008 may originate from a conventional nitrogen production process, such as an air separation plant deploying turbo-expanders or membranes. Stream 1008 may be a slip stream taken from process stream 1004. A reciprocating compressor 1010 may be used to compress stream 1008 to a pressure above or slightly above the highest pressure needed for seal gas streams 1018A and 1018B. However, the cylinder of the reciprocating compressor 1010 is typically lubricated with oil that can be carried as a mist or vapor out of the compressor 1010, contaminating the compressed gas stream 1012 making the compressed stream 1012 unsuitable for use in dry gas seals. Hence, compressed stream 1012 may be fed into unit 1014 for conditioning. Conditioning may involve changing the temperature of the stream by heat exchange or removing particles or oil mist (e.g. via a filter) coming from the reciprocating compressor 1010. The conditioned stream 1020 may then be fed to the SCRS 1001 including adsorption unit 1027 having a valve or a set of valves 1028 which may control (e.g. pulse) the rate of the conditioned feed stream 1020 into the adsorption bed 1025. An exit valve or a set of exit valves 1036 may periodically open and close to allow a utility stream 1040 to leave the adsorption unit 1027. The utility stream 1040 may then optionally be flowed through safety and unit isolation devices 1042 such as unit isolation valves, flow checks, or pressure relief valves can be provided to improve operability. An accumulator vessel 1044 may also be provided to further reduce flow or pressure fluctuations. Optionally, the accumulator 1044 can include a heat exchanger (not shown). Resulting stream 1046 is then the nitrogen rich treated utility stream (seal gas), which may be split into streams 1018A and 1018B for use in the dry gas seals of the compressor 1002. Additionally, a secondary stream 1038 may enter the swing adsorption unit 1027 via a secondary inlet valve or a set of inlet valves 1030, then exit the swing adsorption unit 1027 via a secondary exit valve or valves 1024 that may periodically open and close to allow the reject (e.g. secondary product) stream or set of streams 1026 to leave the swing adsorption unit 1027.

If the swing adsorption unit employs a pressure swing adsorption process the pressure of stream 1026 is preferably less than 20 percent of stream 1040. Optionally, the swing adsorption unit uses a thermal swing adsorption process. In this case a set of valves comprising at least 1034 and 1022 is provided to pulse the flow of heating or cooling fluids that enter and leave the vessel 1029 through streams 1016 and 1032. Electric heating or cooling jacket cooling can also be used to produce the swings. Optionally, the swing adsorption unit 1026 uses a partial pressure purge displacement process. In this case, a valve or set of valves 1030 is provided to pulse the flow of the purge displacement stream 1038 into the adsorption bed 1025. The adsorption bed 1025 is contained within a pressure vessel 1029. Optionally, this vessel 1029 and the associated valving is contained within a secondary pressure vessel 1039. This secondary pressure vessel 1039 is designed to mitigate the significance of leaks through seals in the valves inside the swing adsorption unit 1027. This can be especially important when rotary valves are used. When rotary valves are used, valves 1024, 1028, and 1022 can all be incorporated into a single rotary valve body (e.g. they do not have to be separate valve bodies). Similarly, any optional valves used (1036, 1030, and 1034) can be incorporated with them into a single rotary valve body. To provide a more continuous flow in purified stream 1040, several swing adsorption units 1027 may be employed. If several swing adsorption units 1027 are employed, the utility streams 1040 may be merged.

In some embodiments of the process 1000, the process stream 1004 can be a sour or acid gas stream that is being compressed for injection into an underground reservoir. Pressure of the process stream 1004 being fed to the centrifugal dry seal compressor 1002 can be in a range from 10-100 bar. Pressure of the compressed stream 1006 can be in a range from 100-800 bar with the ratio of pressures between stream 1006 and 1004 being greater than 2:1. In many instances the centrifugal dry seal compressor 1002 will have several compression stages. In a preferred embodiment, the pressure of stream 1006 is greater than 200 bar, even more preferably greater than 400 bar. In another preferred embodiment the gas flow rate in stream 1006 is greater than 20 million standard cubic feet per day (MMSCFD) and even more preferably greater than 200 MMSCFD. The total flow rate of the utility seal gas streams 1018A and 1018B is preferably greater than 0.1 MMSCFD and even more preferably greater than 1.0 MMSCFD. Pressure of the utility seal gas streams 1018A and 1018B needed for the high pressure centrifugal dry seal compressor 1002 are preferably greater than 100 bar and even more preferably greater than 200 bar. Because the high pressure centrifugal dry seal compressor 1002 processes a sour or acid gas stream, the oxygen content in the nitrogen rich seal gas streams 1018A and 1018B is preferably less than 5%, more preferably less than 0.1% and most preferably less than 0.001%. Oxygen present in the seal gas can react with $H_2S$ in the process stream causing the formation of COS and in some cases sulfur deposition.

Conventional nitrogen production processes do not produce a nitrogen stream with sufficient pressure and purity to be used as a seal gas in high pressure centrifugal dry seal compressors such as compressor 1002. It is possible to produce lower pressure nitrogen streams that meet the purity requirements. However, when a reciprocating compressor is used to pressurize these low pressure nitrogen streams they become unsuitable for use in high pressure seal gas applications because they pick up oil vapor, oil additive vapors as well as oil droplets from the oil used to lubricate the cylinder of the reciprocating compressor. The present invention provides a process 1000 to remove these vapors and oil drops, both of which should be removed to provide seal gas for high pressure centrifugal dry seal compressors. Conventional technologies such as cryogenic distillation, permselective membrane separation, and pressure swing adsorption can produce low to modest pressure nitrogen rich streams from an air feed. Oxygen will be present in all of these nitrogen rich streams with the least amount in streams produced by cryogenic distillation. Several methods can be used to remove oxygen from these streams to the levels requires for seal gas applications. At the flow rates required one of the most attractive methods is to catalytically react oxygen in the stream with a hydrocarbon or hydrogen. Water vapor is a product of both of these reactions and can be removed from low pressure and modest pressure nitrogen rich streams using conventional mole sieve adsorption beds or later on in the process using the swing adsorption bed 1025. Stream 1008 is a deoxygenated nitrogen rich stream prepared using the processes or variations of the processes that have been discussed. Except for its water vapor content it meets the purity requirements for utility seal gas streams 1018A and 1018B.

In multi-stage systems requiring different seal gas pressures, the gaseous slip stream may come from the discharge of each stage of intermediate compression or from the discharge of any of the compression stages such that adequate pressure is provided to filter and treat the discharge fluid while still meeting the required seal gas pressure.

Beneficially, it is anticipated that embodiments of the invention could be substantially smaller in size than typical gas treating/conditioning alternatives. Embodiments of the invention have the potential to be much simpler and smaller than traditional bulk separation methods applied to full process streams or full well streams such as solvent extraction, molecular sieve treating, acid gas conversion, or distillation, for example, where bulk separation occurs. Some of these compounds may be separated for their inherent value as a utility or blended with a product stream, while others may be rejected as waste products.

In one form of this invention, these waste products can be returned to the primary process stream from which the gaseous slip stream was originally taken, yielding a process by which no additional waste product streams are produced.

The SCRS process separation may be carried out in a compact swing adsorption unit that would replace traditional, capitally-intense and large equipment such as distillation towers, glycol contactors, and other traditional separation and purification equipment.

While the present techniques of the invention may be susceptible to various modifications and alternative forms, the exemplary embodiments discussed above have been shown by way of example. However, it should again be understood that the invention is not intended to be limited to the particular embodiments disclosed herein. Indeed, the present techniques of the invention are to cover all modifications, equivalents, and alternatives falling within the spirit and scope of the invention as defined by the following appended claims.

What is claimed is:

1. A method of treating a gaseous feed stream, comprising:
producing a gaseous feed stream;
dividing at least a portion of the gaseous feed stream to form a gaseous slip stream;
separating the gaseous slip stream using a selective component removal system having at least one swing adsorption process unit to form a utility stream for use in a utility component;
feeding the first utility stream into the utility component, wherein the utility stream is compatible with the utility component; and
utilizing the utility stream in the utility component.

2. The method of claim 1, wherein the gaseous slip stream is at least one of a hydrocarbon containing feed stream, a nitrogen-rich stream, at least a portion of a high pressure process stream, and at least a portion of a compressor discharge stream.

3. The method of claim 2, wherein the gaseous slip stream is at a pressure above the critical point of the gaseous feed stream.

4. The method of claim 3, wherein the gaseous slip stream is at a pressure of from at least about 100 bar to at least about 500 bar.

5. The method of claim 3, wherein the gaseous slip stream is at a pressure of from at least about 200 bar to at least about 320 bar.

6. The method of claim 1 wherein at least one of the at least one utility component is selected from the group consisting of a compressor, a dry seal compressor, a compressor string, a turbo-expander compressor, a turbo-expander generator, a pump, a fired steam boiler, a fired process heater, a gas engine, a hermetically sealed direct-drive electric motor, turbomachinery equipped with magnetic bearings, gas-operated instruments and controls, and a gas turbine.

7. The method of claim 1 wherein the utility component is located remotely from a gas processing plant.

8. The method of claim 1 wherein the utility stream is utilized as a dry seal gas for at least one of a dry gas seal, a labyrinth seal, and a mechanical seal in the at least one utility component.

9. The method of claim 1 wherein the at least one swing adsorption process unit is selected from the group of units consisting of a pressure swing adsorption (PSA) unit, a thermal swing adsorption (TSA) unit, a partial pressure swing or displacement purge adsorption (PPSA) unit, a rapid cycle thermal swing adsorption (RCTSA) unit, a rapid cycle pressure swing adsorption (RCPSA) unit, a rapid cycle partial pressure swing or displacement purge adsorption (RCPPSA) unit, a compact PSA, a compact TSA, a compact PPSA, and any combination thereof.

10. The method of claim 1 wherein the selective component removal system (SCRS) further comprises at least one of an absorption unit, a membrane separation unit, a molecular sieve, a distillation tower, and a glycol contactor.

11. The method of claim 1 wherein the utility stream is a non-condensible gas stream at an operating temperature and pressure of the utility component.

12. The method of claim 1 wherein the utility stream has a composition, wherein the composition remains in the gaseous phase throughout its utilization in the utility component.

13. The method of claim 1 wherein the utility stream has a composition, wherein the composition is substantially free of toxic and corrosive components.

14. The method of claim 13, wherein the toxic and corrosive components include at least one of $H_2S$, $CO_2$, $H_2O$, and $SO_2$.

15. The method of claim 1 wherein the utility stream has a composition, wherein the composition is substantially completely made up of inert components.

16. The method of claim 15, wherein the inert components include at least one of nitrogen and carbon dioxide.

17. The method of claim 1 wherein the swing adsorption process is performed inside a secondary pressure vessel.

18. The method of claim 17, wherein the secondary pressure vessel is maintained at an inside pressure of from at least about 100 bar to at least about 600 bar.

19. The method of claim 18, wherein the secondary pressure vessel is maintained at an inside pressure of from at least about 200 bar to at least about 500 bar.

20. The method of claim 1, further comprising exchanging heat to or from the swing adsorption process unit by a heat exchanger selected from the group consisting of internal electric heating, jacket cooling, and any combination thereof.

* * * * *